United States Patent
Beck

(10) Patent No.: US 6,521,205 B1
(45) Date of Patent: Feb. 18, 2003

(54) PROCESS FOR THE PRODUCTION OF HYDROGEN BY THERMAL DECOMPOSITION OF WATER, AND APPARATUS THEREFOR

(75) Inventor: J. Thomas Beck, Saskatoon (CA)

(73) Assignee: SHEC Labs—Solar Hydrogen Energy Corporation, Saskatoon (CA)

( * ) Notice: Subject to any disclaimer, the term of this patent is extended or adjusted under 35 U.S.C. 154(b) by 0 days.

(21) Appl. No.: 09/508,179

(22) PCT Filed: May 5, 1999

(86) PCT No.: PCT/CA99/00382

§ 371 (c)(1),
(2), (4) Date: Oct. 10, 2000

(87) PCT Pub. No.: WO99/57058

PCT Pub. Date: Nov. 11, 1999

(30) Foreign Application Priority Data

| May 5, 1998 | (CA) | ............................................. 2236738 |
| Jun. 9, 1998 | (CA) | ............................................. 2240214 |

(51) Int. Cl.[7] .......................... B01D 45/12; C01B 3/04
(52) U.S. Cl. .................... 423/658.2; 55/457; 55/459.1; 422/147; 422/187; 422/190; 422/227; 423/579
(58) Field of Search ............................ 55/457, 459.1; 422/147, 187, 190, 227; 423/658.2, 579

(56) References Cited

U.S. PATENT DOCUMENTS

| 3,768,172 | A | * | 10/1973 | Klein et al. ................. 55/459.1 |
| 3,901,669 | A | | 8/1975 | Seitzer ..................... 423/648.1 |
| 3,922,871 | A | | 12/1975 | Bolesta ............................ 62/5 |
| 4,030,890 | A | | 6/1977 | Diggs ......................... 422/186 |
| 4,053,576 | A | | 10/1977 | Fletcher ...................... 423/579 |
| 4,070,171 | A | * | 1/1978 | Wikdahl .................... 55/459.1 |
| 4,071,608 | A | | 1/1978 | Diggs ......................... 423/579 |
| 4,233,127 | A | | 11/1980 | Monahan .................. 204/157.1 |
| 4,332,775 | A | | 6/1982 | Genequand et al. ......... 422/112 |
| 4,343,772 | A | | 8/1982 | Levin et al. ................. 422/200 |
| 4,696,809 | A | | 9/1987 | Vialaron et al. ............. 423/579 |
| 5,163,986 | A | * | 11/1992 | Bielefeldt ................... 55/459.1 |
| 5,195,165 | A | | 3/1993 | Ono et al. ................... 392/407 |
| 5,397,559 | A | | 3/1995 | Kogan ......................... 423/579 |
| 5,453,196 | A | * | 9/1995 | Tuszko et al. .............. 55/459.1 |
| 5,461,868 | A | | 10/1995 | Finko ............................... 62/5 |
| 5,483,801 | A | | 1/1996 | Craze et al. ..................... 62/5 |
| 5,779,746 | A | * | 7/1998 | Buchanan et al. .......... 55/459.1 |
| 5,976,227 | A | * | 11/1999 | Lorey ......................... 55/459.1 |
| 6,190,543 | B1 | * | 2/2001 | Christiansen .............. 55/459.1 |

FOREIGN PATENT DOCUMENTS

| DE | 43 02 089 A1 | 7/1994 | ............. C01B/3/04 |
| FR | 2 481 251 | 10/1981 | ............. C01B/3/04 |
| WO | WO 80/00957 | 5/1980 | ............. C01B/1/03 |

\* cited by examiner

*Primary Examiner*—Wayne A. Langel
(74) *Attorney, Agent, or Firm*—Townsend and Townsend and Crew LLP

(57) ABSTRACT

The invention provides processes and apparatus for producing hydrogen from water, including the steps of heating water to a water dissociating temperature to form a dissociated water reaction mixture comprising hydrogen gas and oxygen gas. A vortex is formed of the reaction mixture to subject the reaction mixture to a centrifugal force about a longitudinal axis of an interior space of a vortex tube reactor, so that there is radial stratification of the hydrogen gas and the oxygen gas in the interior space of the vortex tube reactor. Hydrogen or oxygen is preferentially extracted from the reaction mixture at spaced apart points along the length of the interior space of the vortex tube reactor.

14 Claims, 21 Drawing Sheets

PROCESS FOR THE PRODUCTION OF HYDROGEN BY THERMAL DECOMPOSITION OF WATER, AND APPARATUS THEREFOR

FIELD OF THE INVENTION

The invention is in the field of methods and apparatus for the production of hydrogen by thermal decomposition of water.

BACKGROUND TO THE INVENTION

Hydrogen has long been viewed as an ideal combustible energy source. The product of hydrogen combustion in air is essentially water, although under some conditions traces of oxides of nitrogen may also be produced. Hydrogen combustion produces no carbon dioxide, a major 'greenhouse' gas which figures prominently in concerns about the deteriorating state of the environment, particularly in urban areas. Recent developments in fuel cell technology, and the high overall energy efficiency of fuel cells, have helped to produce conditions favorable to the more widespread adoption and use of hydrogen fuel.

Production of hydrogen is now mainly carried out by reforming hydrocarbons, such as methane, and to a lesser extent, by electrolysis of water. These processes typically involve the use of energy sources that create pollution. For example, hydrocarbon consumption at thermal power stations is part of the hydrogen production chain in some electrolytic processes. As a result, there is a long-felt need for efficient methods to transform water, either directly or indirectly, into hydrogen.

There are a number of thermal processes for producing hydrogen from water that may make use of solar energy. One such process is the direct decomposition of water in solar furnaces at very high temperatures, typically in the range of 2200–2500° C. Many of these processes are not very efficient, yielding only 10–15% of the available hydrogen. A number of references disclose methods of obtaining hydrogen from a solar-powered thermal water dissociation reaction by selectively extracting either the hydrogen or oxygen through a porous material such as metallic nickel. (see U.S. Pat. Nos. 5,397,559; 4,233,127; 4,053,576; 5,306,411; as well as "Possibilities of Separating Water Thermaolysis Products in Solar Furnaces", Shakhbazov et al. 1977, Gelioteknika, Vol. 13, No. 6, pp. 71–72, UDC 621.472). A potentially important limitation to the commercial implementation of such diffusion methods is that the rate of gas separation depends significantly on the area of diffusion surface available. Very large diffusion or membrane surface areas may be required for large scale production of hydrogen. It may therefore be necessary to heat large diffusion areas to very high temperatures to allow the separation of the desired molecule to occur prior to cooling of the gasses, in order to prevent recombination of hydrogen and oxygen. The heating of such large areas may pose significant commercialization problems due to radiant energy loses and attendant inefficiencies.

U.S. Pat. Nos. 4,030,890 and 4,071,608 to Diggs propose separating hydrogen from oxygen by centrifugal forces. Diggs discloses a chamber for separating hydrogen and oxygen which has an oxygen outlet and a hydrogen outlet. The oxygen outlet is circumferentially located in the peripheral walls of the chamber close to the bottom of the chamber, at the end of the chamber where water vapor is introduced. The hydrogen outlet in the Diggs device is axially located at the top end of the chamber, at the opposite end of the chamber from the end where water vapor is introduced. This arrangement of hydrogen and oxygen outlets in the Diggs device is predicated upon a particular spacial distribution of oxygen and hydrogen gases in the vortex of the reaction chamber. However, the behavior of heated gases in a vortex tube is complex. In a process sometimes termed the Ranque effect, a gas stream may be separated in a vortex tube into two outlet streams, one of which is hotter and one which is colder than the temperature of the gas feed (see U.S. Pat. No. 1,952,281). In such a process, it is taught in the art that pressure and compositional gradients form in the tube both axially and radially with the result that the vortex core contains a cooled gas that flows in a direction opposite to the direction of flow of the heated gas at the periphery of the vortex. This effect may be used to separate vapors from a gas stream, as disclosed in U.S. Pat. Nos. 4,343,772 and 5,843,801. In contrast, U.S. Pat. No. 3,922,871 discloses alternative flow parameters that are suggested to produce the opposite stratification of gas temperatures within a vortex, with the hotter gas localized in the vortex core. Although this reference does not teach specific gas separations, it is illustrative of the variability that may be encounter in vortex gas flow.

There is a need for alternative methods and devices for production of hydrogen by thermal dissociation of water, particularly methods and devices that may be adapted for use with solar energy.

SUMMARY OF THE INVENTION

In one aspect, the invention provides a process for producing hydrogen from water including heating water to a water dissociating temperature to form a dissociated water reaction mixture comprising hydrogen gas and oxygen gas. A vortex is formed of the reaction mixture to subject the reaction mixture to a centrifugal force about a longitudinal axis of an interior space of a vortex tube reactor, so that there is radial stratification of the hydrogen gas and the oxygen gas in the interior space of the vortex tube reactor. Hydrogen gas is preferentially extracted from the reaction mixture at spaced apart points along the longitudinal axis of the interior space of the vortex tube reactor. Alternatively, the process may include preferentially extracting oxygen gas from peripheral portions of the vortex at longitudinally spaced apart points along the circumference of the vortex tube reactor. The water may be heated to a dissociating temperature with concentrated solar radiation focused on the vortex tube reactor, and the water dissociating temperature may be between about 1800° C. and about 3000° C. The reaction mixture may be contacted with a catalyst that catalyzes the dissociation of the water into hydrogen and oxygen. A vacuum may be applied to preferentially extract the hydrogen or oxygen gases.

In another aspect, the invention provides a vortex tube reactor comprising an elongate wall having first and second ends, the wall and ends together defining an interior space having a longitudinal axis and adapted to house a vortex. An inlet port is provided in the first end for tangentially introducing a gas into the interior space to initiate circumferential movement of the gas in the interior space about the longitudinal axis to form the vortex. A hydrogen draw tube may be provided concentrically located in the interior space along the longitudinal axis, the hydrogen draw tube being porous to hydrogen gas at longitudinally spaced apart points. Alternatively, an oxygen draw tube may be provided concentrically located in the interior space adjacent to the cylindrical wall, the oxygen draw tube being porous to oxygen gas at longitudinally spaced apart points. The reactor may be comprised of a refractory material adapted to withstand a water dissociating temperature.

Although solar energy may be used in accordance with the invention to disassociate water into hydrogen and oxygen, other sources of heat may be used. The radiant energy capture unit may also have application in solar distillation processes, and solar heated boiler systems used to generate steam for heating and for turbine use, especially in solar turbine electric systems.

By removing one of the dissociation products from within the vortex reactor, the equilibria of the dissociation reaction may be driven further to completion. The stratification in the vortex tube of the oxygen and hydrogen may also shift the equilibrium of the dissociation reaction towards completion. Preferably, operating temperatures in the final reactor are maintained at levels close to the primary reactor, to facilitate rapid equilibration. With inadequate residence time or fall off in temperature of the final reactor, residual material from the transition zone remaining in the final reactor can be separated at a heavy ends exit port and sent for recycle. With a well insulated system, the oxygen exiting the final reactor can be sent to one or more additional polishing stratification stages before being heat exchanged with feed water. The same can be done with hydrogen as needed.

Solar energy may be provided to the chemical process section by means of many banks of computer controlled mirrors, typically to produce temperatures of about 2500° C. required to partially decompose water into hydrogen and oxygen.

Feed water for the process of the invention is advantageously purified by filtration by known means, preferably before passing to a first heat exchanger. Preheated water from the first heat exchanger may then be piped to a combination heat exchanger and solar distillation unit, where the water is further purified by distillation. The distilled water may then be cooled in the first heat exchanger, transferring thermal energy to the in-feed water. The water may then be further purified in a third stage, such as reverse osmosis. Purified water may then be sent to the radiant energy capture system which captures a major portion of the energy which would otherwise be lost from thermal radiation. The heated water from this recapture unit is then piped into a third specially designed heat exchanger which heats the water to super heated steam with heat from the final stage of the solar reactor. This steam continues through the first stage solar reactor under pressure of about 10 atmospheres. This piping leads to the orifice within the reactor which allows the pressure to build. This high pressure allows better thermal transfer and keeps the water from splitting due to its higher pressure.

Hydrogen can be removed from a point near the stabilization zone of the vortex by a smaller diameter inner draw pipe. This step may be assisted by the use of a comparative vacuum that is not so strong that it disrupts gas dynamics at intermediate and peripheral zones.

Internal tubing in the RH vortex tube may be used to effect gas separation In one embodiment, inner core diameter may be about 20–30% of vortex tube diameter. An effective single point of removal has been found to be about 25% of the distance down the core from the tangential inflow. The core may be porous or perforated and of extended length in order to promote removal of hydrogen from the vortex tube.

Reactions other than the dissociation of water may be accelerated or catalyzed in accordance with the present invention. For example, ammonia could be made to decompose in a similar manner. Methane reforming may be considered. Other systems are possible if the appropriate mass distribution applies to reactants and products.

Other heat sources can be used such as waste heat from thermal electric stations. Although this heat is lower than required for disassociation of water, it would provide a preheat to the process. Later heating stages could use electricity. Candidates for this include fossil fuel and nuclear power plants. Geothermal is another source of heat which would be non-polluting. Again geothermal could be used as a preheat to the process with secondary heating coming from geothermal electric, solar or other.

Accordingly, in one aspect, the invention provides a method for transferring concentrated solar energy or other source of thermal energy to a water vapor stream comprising a $1^{st}$ stage reactor having a confined path, in which the vapor stream undergoes directional changes thereby forcing the vapor against the walls of the chamber, causing turbulence and effecting a more efficient energy transfer. This may be facilitated by a variety of reactor conformations, including helical, conical, or zig-zag paths, or by providing protrusions in the reactor that give rise to turbulence, or by other means in which directional changes force the vapor stream against the walls of the reactor under increased pressure, or in which increased turbulence increases the thermal energy transfer from the reactor walls. In some embodiments, enlarged surface areas may be provided within the vapor stream by means of fins protruding from the walls of the channels in which the vapor passes, to cause a more efficient energy transfer. An orifice may be provided, restricting the output of the $1^{st}$ stage reactor, so that the vapor pressure is increased due to the orifice restriction, thereby increasing the density of the water vapor and increasing the efficiency of energy transfer to the water vapor. The increase vapor pressure may also help to prevent the disassociation of the water vapor, thereby increasing thermal conductance.

In an alternative aspect, the invention provides a method for disassociating water in a $2^{nd}$ stage reactor, in which water vapor is partially disassociated and further thermal energy is absorbed. An orifice restriction may be provided on the input of the $2^{nd}$ stage reactor, to restrict the vapor flow. A vacuum may be provided from the output of the $2^{nd}$ stage reactor, to create a partial vacuum in the $2^{nd}$ stage reactor, causing partial disassociation of the vapor stream. The partial vacuum may cause an endothermic expansion in the vapor stream, during which additional solar or thermal energy may be added to cause further disassociation. The path taken by the gas in the $2^{nd}$ stage reactor may be adapted as described above for the $1^{st}$ stage reactor to facilitate transfer of thermal energy to the gas. A catalyst may be provided within $2^{nd}$ stage reactor to facilitate disassociation of the vapor stream.

In an alternative aspect, the invention provides methods whereby water vapor at dissociating temperatures, is subjected to centrifugal forces by high vortex swirl velocities in a $3^{rd}$ stage vortex tube reactor (FIG. 25), such that there is stratification of the reaction mixture within the interior of the reactor, region 36, preferably leading to further decomposition of water vapor to hydrogen and oxygen by mass action. Hydrogen gas or oxygen gas, or both gasses, may be selectively removed from the stratification zones within the interior space of the vortex reactor, preferably along a portion of the axial length of the stratification zone, shifting the equilibrium of the dissociation reaction to further decompose the water vapor. In alternative embodiments, vacuum pumps (49 and 52 of FIG. 2) may be used to apply partial vacuums adjustably applied to the oxygen exhaust 39

(FIG. 2) and hydrogen exhaust 38 (FIG. 2) ports of the reactor 36, to facilitate decomposition of water vapor to hydrogen and oxygen. The pressure differential across the hydrogen collection tube may also be adjusted by varying the speed of the vortex (by adjusting parameters such as the number of injectors and the velocity of gas injection) and also by adjusting the vacuum on the tube, to optimize the collection of hydrogen. Concentrated solar or thermal energy may be continually fed to the $3^{rd}$ stage reactor to cause further and continuous disassociation of water vapor. A catalyst may be provided within $2^{nd}$ stage reactor to facilitate disassociation of the vapor stream, and the catalyst may be provided on a ceramic substrate. Automated controls may be provided to measures the amount of water vapor exiting the hydrogen and oxygen exhaust ports, and this information may be used to automatically adjusts the balance of partial vacuum between the hydrogen and oxygen exhaust ports of the reactor to minimize any detected imbalance, or otherwise optimize the values, to facilitate decomposition of water vapor to hydrogen and oxygen. In some embodiments, the vacuum on each of the hydrogen and oxygen exhaust lines of the $3^{rd}$ stage reactor may be balanced, to maintain a controlled stratification zone. Similarly, the overall partial pressure in the $3^{rd}$ stage reactor may be adjusted to maintain preferred disassociation and stratification conditions.

In various aspects, the invention provides adaptations to facilitate efficient energy transfer. In one aspect, the invention provides a shaped target 37 (FIG. 2) to facilitate thermal energy absorption from concentrated sunlight. The shape of the target may be concave, preferably being adapted to result in the capture of additional thermal and light energy. In another aspect, radiant energy losses may be ameliorated using a radiant energy recapture unit in which a light valve (16 and 20 of FIG. 4) allows concentrated solar energy to enter the reactor region through a window (FIG. 5), shaped prisms, or shaped reflectors d58 (FIG. 7A and FIG. 7B). The omnidirectional scattering of reflected light and radiated energy from the reactor may be redirected into the reactor region by optimizing total internal refraction, and angular reflection, from the window, shaped prisms, or shaped reflectors. Energy absorbed by the light valve (a window, shaped prisms, shaped reflectors or an equivalent thereof) may be used to preheat the inflow water to the reactor. These mechanisms may be kept cool with water passing through channels (16 of FIG. 4 and 63 of FIGS. 5 and 5A), and the heated water may be used as to preheat the reactor input. The light valve may be limited in size, to allow only the concentrated solar energy to enter, to the extent possible, in order to minimize outward energy losses. The area surrounding the reactor, other than the light valve, may be adapted to reflect radiant energy back to the reactor (18, 22, and 23 of FIG. 4). The energy reflector (16 and 17 of FIG. 4) may be cooled by a water stream, and the energy absorbed by the water stream may be used to preheat the water feeding the reactor. The outside of the reflector assembly (21 of FIG. 4) around the reactor, excluding the light valve, may be made of a reflective material, and any energy absorbed may be used to preheat the water feeding the reactor. The cooling water pressure within the flow channels (16 of FIG. 4) in the radiant energy recapture unit may be regulated to compensate for the variable flow of water through the system. The reactor may be adapted so that concentrated solar energy striking the support struts of the energy recapture unit may be reflected onto the reactor. Hot exhaust gases of hydrogen and oxygen from the reactor may be used in a high temperature heat exchanger, with the infeed water in the opposing flow direction. The gas stream in the heat exchanger may be adapted, as discussed above, to force the gases against the walls of the exchanger to effect more efficient energy transfer. The heat exchanger may be constructed of ceramic materials in which structural integrity is maintained by having a continuous structure which is self supporting in which long thermally conductive heat exchange pathways are layered upon each other with thermally insulating materials isolating the thermally conductive pathways therefore providing a structural integrity. Thermal breaks may be established, using thermally conductive material, along the length of the thermally conductive pathways of the high temperature heat exchanger, to provide thermal pathways though the insulating material (FIG. 11). A combination heat exchanger/distiller (8 of FIG. 2) may be used with lower temperature exhaust gases from the high temperature heat exchanger, in which the hot outflow gases are heat exchanged with the inflow water to cause the inflow water to be distilled. Concentrated solar energy focused on the heat exchanger/distiller may be used to heat the inflow water when insufficient energy is not available from the hot outflow exhaust gases. The low temperature heat exchanger may be made of metals such as stainless steel. Energy may be retrieved from the condensation of the steam from the combination heat exchanger/distiller, for use in heating (6 of FIG. 2) the infeed water. The steam may be cooled to close to the ambient infeed water temperature and further filtered by a reverse osmosis system and used to cool other processes such as the energy recapture unit. The infeed water may be preheated, for example by a counter flow method, to condense the hot steam from the heat exchanger/distiller and to preheat the water which feeds into the heat exchanger/distiller. The heat exchanger may form an integral part of the combination heat exchanger/distiller and may be used to recover the heat of fusion from converting water into steam. Water vapor may be condensing out of the hydrogen and oxygen air streams after disassociation, separation and cooling (50 and 53 of FIG. 2). The air steams may be cooled to condense water vapor. and the condensed water may be fed back into the process to help minimize the amount of water purification required in the overall system (by reducing the amount of new infeed water required). One aspect of the invention provides a method of reclaiming energy from a reflective surface, in which water is used to cool the surface and this water is in turn used to heat a reactor input reactor.

DETAILED DESCRIPTION OF THE INVENTION

The following description relates to illustrated, exemplified and preferred embodiments of the invention. As will be apparent, many of the particular parts of the invention that are disclosed are not necessary to practice the invention in all of its embodiments, and many of the particular embodiments that are described have equivalents that may be substituted to achieve the objects of the invention. Unless an element of the invention is specifically recited as essential to the invention, it is not required for all embodiments, and the present disclosure contemplates and encompasses a full range of equivalents for that part of the invention.

Figure 1:
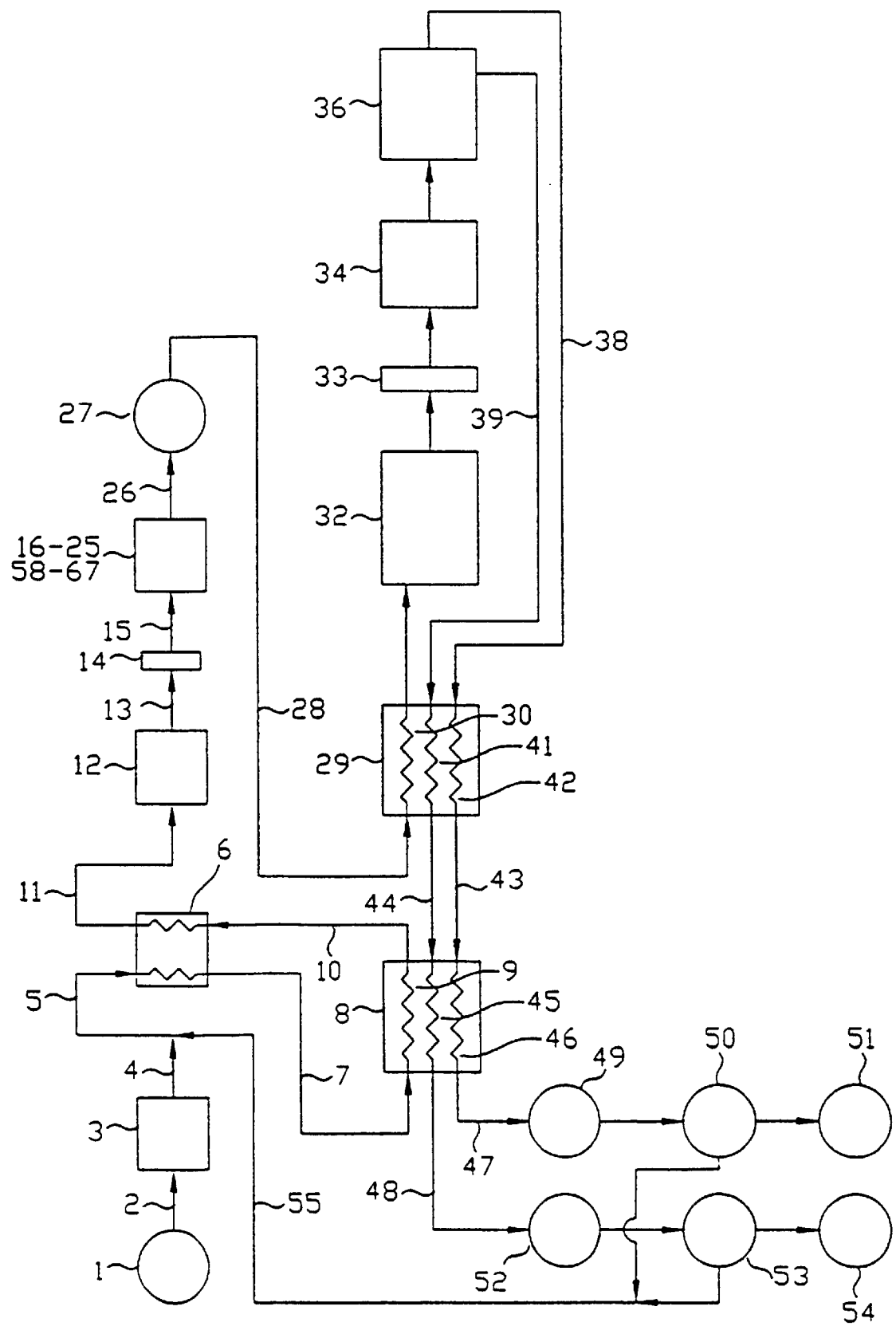
FIG. 1 shows a schematic view of the preferred embodiment of this invention, for use as a solar hydrogen production process.
Figure 2:
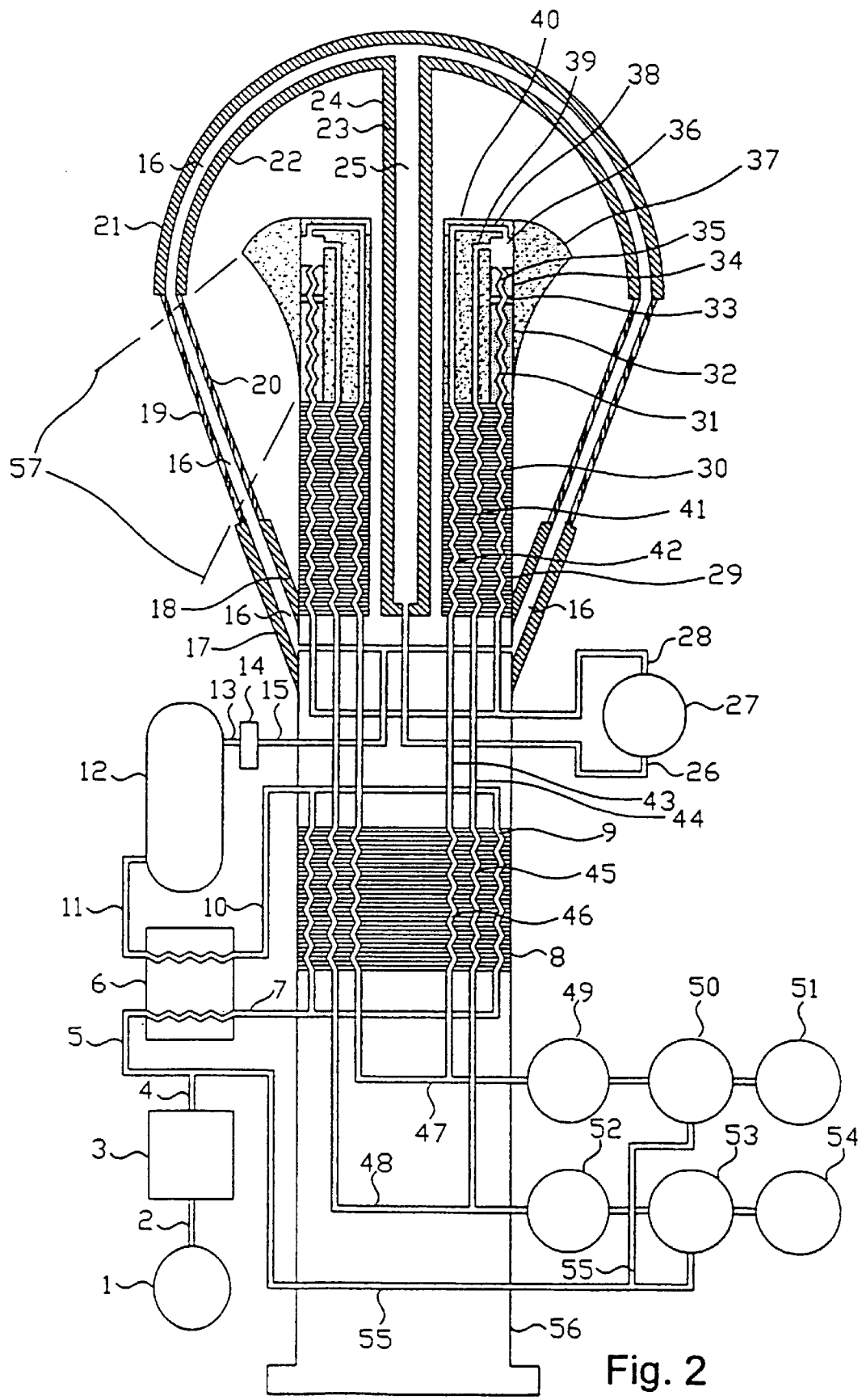
FIG. 2 shows a cross sectional pictorial view of the preferred embodiment of this invention which closely follows the FIG. 1 process.

Referring to FIG. 1 and FIG. 2, in the illustrated embodiment, the water supply and feed pump 1 feed water by supply pipe 2 to a water filter 3. Water filter 3 removes particulate matter, partially purifying the water. This partially purified water is then fed by pipe 4, and is combined with recycled water from pipe 55, and feeds through pipe 5 to an opposing flow or cross flow heat exchanger 6. Heat exchanger 6 heats the inflow water with heat transferred from another part of the process. The heated water from the heat exchanger 6 then feeds by pipe 7 to combination solar distiller heat exchanger 8. Solar distiller heat exchanger 8 uses solar energy to distill the water at the start of the process; however, after the process is running, the hot exhaust gases from pipes 44 and 43 transfer heat by heat exchanger channels 45 and 46 through a cross flow heat transfer method to the distillation section 9 within the exchanger unit 8. Solar energy therefore may not be required for distillation once the process of the invention is up to operating temperature.

Distilled water from the combination solar distiller heat exchanger 8 may be fed by pipe 10 back to heat exchanger 6, where the heat from the distillation process is recovered and used to preheat the inflow water feeding from pipe 5. In this way, energy used for distillation may be recovered to improve the efficiency of the overall process. Distilled water from heat exchanger 6 is fed by pipe 11 to a final water purification stage 12. The final water purification stage 12 can be a reverse osmosis or other high purification method. Reverse osmosis is a low energy process, but normally requires periodic maintenance due to filtration membranes plugging. The predistilled water from solar distiller heat exchanger 8 however, should lack most of the mineral contaminants, thereby reducing maintenance on a reverse osmosis or other high purification method 12. The output of the final water purification system 12 is pumped under enough pressure to raise the water to the top of the solar hydrogen tower 56. This pressurized purified water from water purification and pressurization system 12 is fed by pipe 13 to pressure regulator 14. Although purified water is a preferred feedstock for dissociation, it is not a requirement for all embodiments.

This regulated pressure high purity water may be fed by pipe 15 to the radiant energy recovery system 16-25, 58-67. Pressure regulator 14 limits the pressure to safe levels so damage is not done due to excessive pressures in the radiant energy recovery system 16-25, 58-67. The radiant energy recovery system is adapted to recapture energy which would be lost due to radiant heat loss in the reactor section 32, 33, 34, and 36, and heat exchanger 29.

The regulated pressure high purity water fed by pipe 15 may go up between outer window support structure 17 and inner window support structure 18. These support structures may be made of micro polished stainless steel or other highly reflective thermally conductive material. The reflectivity of outer window support structure 17 will reflect concentrated solar energy 57 which may fall onto this surface. The reflectivity of inner window support structure 18 may be adapted to reflect radiant energy from within the structure, back into the structure. Heat absorbed through conduction may be transferred to the water flow 16 between the structures 17 and 18. This heated water may be added to the process preheat.

In the illustrated embodiment, the water further travels up the radiant energy recovery structure 16-25, 58-67 between outer one way window 19 and the inner one way window 20. These windows may be constructed of quartz glass. Windows 19 and 20 may be one way windows, allowing concentrated solar energy 57 to enter the radiant energy capture unit 16-25, 58-67 and inhibiting escape of radiant energy back out of the unit. Energy absorbed by these windows 19 and 20 may be dissipated by cooling the water flow 16 going up between the windows. Energy absorbed in water flow 16 may be added to the overall process to improve efficiency. The water may further travel up the structure to the dome, which consists as illustrated of outer hull 21 and inner hull 22. These domes may be constructed of micro polished stainless steel or other highly reflective and thermally conductive material. The reflectivity of outer dome 21 will reflect concentrated solar energy 57 which may fall on this surface. The reflectivity of inner dome 22 will reflect radiant energy from within the structure, back into the structure. Heat absorbed through conduction may be transferred to water flow 16 between the structures 21 and 22. This heated water may be added to the process preheat. Outer dome 21 and inner dome 22 can be separated by spacers or other various construction methods to hold the domes together and provide a consistent spacing between the domes. The dome shape is not necessary and other shapes can be implemented.

The water may finally be drawn down the center 25 of the hollow support structure 23. In some embodiments, the surface of this support structure 24 can be made of micro polished stainless steel or other highly reflective, non-tarnishable and thermally conductive material. Radiant energy from the various components of the reactor core and other components in the energy capture unit 16-25, 58-67 are reflected back into the energy capture unit 16-25, 58-67. Any absorbed energy may again be added to the process preheat.

Radiant energy which is absorbed by the radiant energy capture unit 16-25, 58-67 may be used to heat the cooling water of the radiant energy capture unit 16-25, 58-67. This heated water may be fed by pipe 26 to pressurization pump 27. Pressurization pump 27 may be used to raise the pressure of this water to about ten atmospheres. Other pressures are possible. This high pressure water may be fed by pipe 28 to the high temperature heat exchanger 29. High temperature heat exchanger 29 may be used to superheat the water. The water traveling through channel 30 of heat exchanger 29 is heated by thermal conduction of heat transferred from the superheated exhaust gases of adjacent channels 41 and 42. This superheated steam may then be fed directly to the first stage reactor 32, still under a pressure of about ten atmospheres (in some embodiments). High pressures may be used in some embodiments to increase the equilibrium temperature of the thermal splitting of the water, and to keep the steam from disassociating into hydrogen and oxygen. This may allow for greater thermal absorption of the solar energy bombarding the first stage reactor 32. Concentrated solar energy 57 bombarding reactor target 37 may be thermally conducted to the $1^{st}$ stage reactor 32 as well as $2^{nd}$ and $3^{rd}$ stage reactors 34 and 36 respectively. Reactor target 37 is shaped to provide the best solar energy 57 absorption and minimize reflective losses.

In the illustrated embodiment, the top, or output of the $1^{st}$ stage reactor 32, connects to an orifice 33. Orifice 33 may be used to restrict the flow of gases, allowing a higher pressure to be built up in the $1^{st}$ stage reactor 32. Higher pressures may in some embodiments increase the volume of flow through the reactors 32, 34, and 36, and may increase the amount of product flow through the system as a whole. In some cases, with higher levels of solar radiation 57 available, pump 27 may be used to increase pressures and hence increase the rate of hydrogen production from the system. The output of orifice 33 feeds directly to the $2^{nd}$ stage reactor 34. An immediate pressure drop may be realized on this side of the orifice, particularly when a partial vacuum is created by process balancing pumps 49 and 52 (described in more detail below with reference to further aspects of the process). This lower pressure may cause an endothermic expansion of the superheated steam, facilitating absorption of additional thermal energy for dissociating the super heated steam. A lower pressure may also lower the equilibrium dissociation temperature. An appropriate catalyst may be placed within the flow channel 35 of the $2^{nd}$ stage reactor 34. Channel 35 of the $2^{nd}$ stage reactor 34 is, in some embodiments, sufficiently long to allow water splitting to occur to equilibrium.

As illustrated, the output of the $2^{nd}$ stage reactor 34 is fed into the $3^{rd}$ stage reactor(s) 36. One or more $3^{rd}$ stage reactor(s) 36 may be used in parallel. The $3^{rd}$ stage reactor 36 is a vortex tube reactor in which a reaction mixture (typically comprised of H, $H_2$, O, $O_2$, hydroxyl's, and $H_2O$) is rotated in a vortex, subjecting the reaction mixture to centrifugal forces. There is radial stratification of the hydrogen gas and the oxygen gas in the interior space of the vortex tube reactor. $O_2$ typically migrates to the outside of the vortex in the $3^{rd}$ stage reactor 36, from where it may be extracted, while the lighter elements of H and $H_2$ typically migrate towards the axial center of the vortex. The removal of hydrogen from the axial region of the vortex, or the removal of oxygen from the periphery of the vortex; pushes the equilibrium of the dissociation reaction further. A catalyst can also be used within reactor 36 to reduce the temperature required to split $H_2O$. The catalyst structure may follow the helical flow of the gases in the $3^{rd}$ stage reactor 36 in a manner that is adapted not to interfere with the helical flow of the gases. The vortex tube reactor 36 will generally be elongated and cylindrical, but may have a number of conformations to facilitate dissociation, such as conical or tapering conformations. The tubular wall of the reactor will generally be symmetrical about the longitudinal axis of the reactor, to facilitate formation of the vortex.

Hydrogen may be exhausted through port 38 while oxygen is exhausted through port 39 of high temperature piping structure 40 which is part of the entire reactor structure consisting of 32, 33, 34, 36, and 37. Hot hydrogen and oxygen may be fed to the top of high temperature heat exchanger 29. As illustrated, the hydrogen feeds through channel 42 and the oxygen through channel 41 of the high temperature heat exchanger 29. Thermal energy is transferred by thermal conduction and thermal radiation from the exhaust gas channels 42 and 41, to the steam input channel 30. This exhaust heat is used to superheat the steam feeding to the $1^{st}$ stage reactor 32.

The cooled hydrogen and oxygen may be fed from high temperature heat exchanger 29, by connecting pipes 43 and 44 respectively, to the combination solar distiller heat exchanger 8 where the hydrogen feeds through channel 46 and the oxygen feeds through channel 45. The heat is transferred from these channels to channel 9 where the heat is used to heat the inflow water to distillation temperatures. Sufficient heat still remains after the high temperature heat exchanger 29 to distill water in the combination solar distiller heat exchanger 8. Cooled hydrogen may then be removed from the combination solar distiller heat exchanger 8 and fed by pipe 47 to the hydrogen vacuum pump 49. The output of the hydrogen vacuum pump 49 may be fed to water scrubber 50, where water is removed from the hydrogen gas. It will be understood that the hydrogen exhaust may not be 100% hydrogen and the oxygen may similarly not be 100% pure. Any oxygen hydrogen mixture from the $3^{rd}$ stage reactor which exits the high temperature pipe 38 may recombine to water as the temperature is cooled through the high temperature heat exchanger 29. After the water is removed by water scrubber 50, remaining hydrogen may then be sent to hydrogen storage 51. Water which is removed from water scrubber 50 may be recycled through pipe 55. Cooled oxygen is likewise removed from the combination solar distiller heat exchanger 8 and fed by pipe 48 to the oxygen vacuum pump 52. The output of the oxygen vacuum pump 52 may be fed to water scrubber 53 where water may be removed from the oxygen gas. After water is removed by water scrubber 53, remaining oxygen may then be sent to oxygen storage 54. The water which is removed from water scrubber 53 may be recycled through pipe 55.

The vacuum pumps 49 and 52 may be used to create a vacuum for the $2^{nd}$ and $3^{rd}$ stage solar reactors 34 and 36 respectively. The pumps may maintain a balanced vacuum in order for the $3^{rd}$ stage reactor 36 to function optimally. Too much vacuum on hydrogen vacuum pump 49 in relation to oxygen vacuum pump 52 may in some embodiments result in excessive oxygen being drawn into the hydrogen exit line. In similar fashion, too much vacuum on oxygen vacuum pump 52 in relation to hydrogen vacuum pump 49, may in some embodiments cause excessive hydrogen to be drawn into the oxygen exit line. The vacuum pumps may operate under automated or computer control, following algorithms and look-up tables for variable operating conditions.

Figure 3:
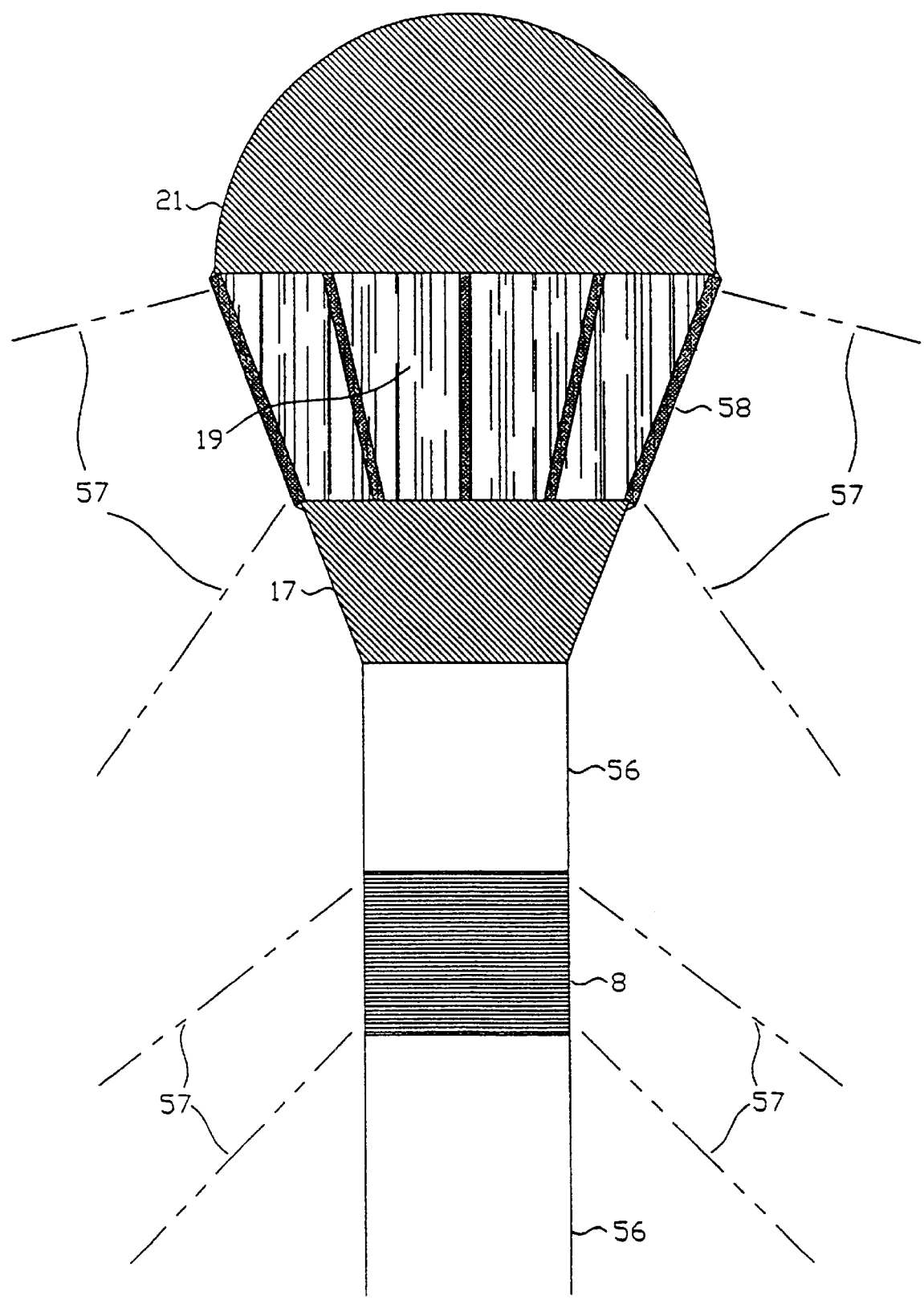
FIG. 3 shows an outside view of the solar hydrogen tower indicating where the incident solar radiation bombards the tower.

FIG. 3 shows an outside view of the solar hydrogen tower. The superstructure of tower 56 may be constructed using various well known techniques. The top of the tower shows the radiant energy capture unit 16-25, 58-67. The top outside dome 21, water cooled struts 58, outer one way mirrored window 19, and outer window support structure 17 are visible. The concentrated solar energy 57 enters through the mirrored one way windows 19. The concentrated solar energy 57 comes from computer steered mirrors 81, 82, or 83 as shown in FIG. 31, FIG. 32, FIG. 33, FIG. 34, and FIG. 35. A portion of this concentrated solar energy 57 is used on the combination solar distiller heat exchanger 8 during process startup at the beginning of the day. After process startup, all of the concentrated solar energy 57 can be focused towards the reactor target 37 of FIG. 2 within the radiant energy capture unit 16-25, 58-67.

Figure 4:
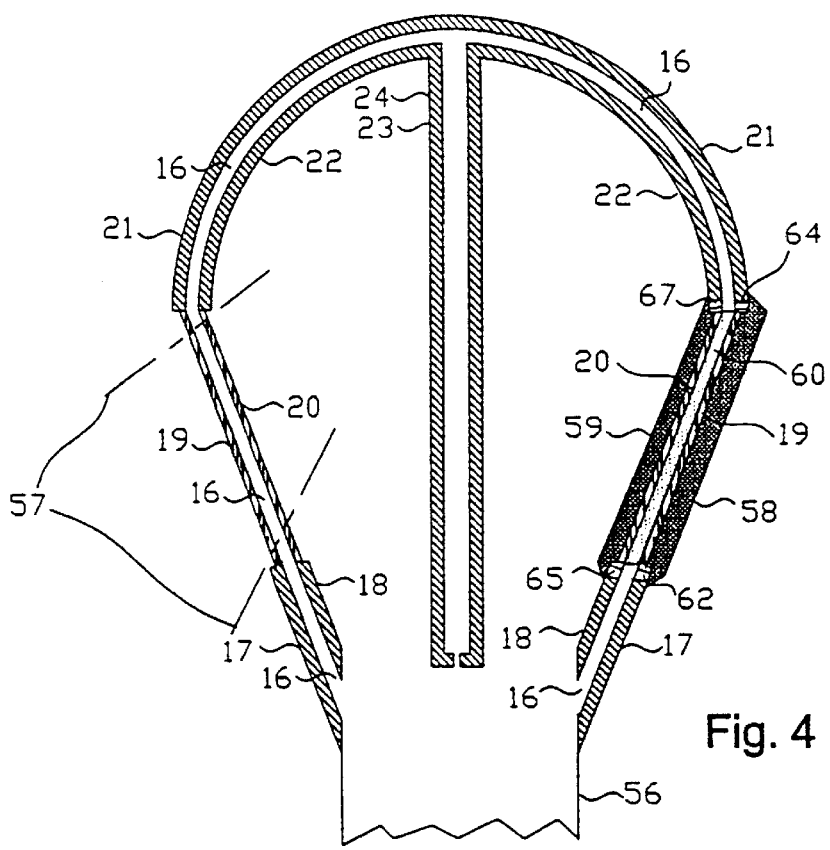
FIG. 4 shows the side view and general placement of the strut and one way window design for the radiant energy capture system of the solar hydrogen generator.

FIG. 4 shows a simplified cutaway side view and general placement of the struts and one way window design for the radiant energy capture system 16-25, 58-67 of the solar hydrogen generator. Purified water 16 passes between the inner and outer structures 18 and 17 respectively. Structure 18 and 17 can be made of micro polished stainless steel or other highly reflective and non-tarnishable material. The high reflectivity may prevent meltdown of the material in the event of misguided concentrated solar energy 57, and high temperature radiant energies within the structures. The purified water 16 flowing within the structure may also absorb energy by thermal conduction.

The purified water flows upward between the one way mirrored glass windows 19 and 20. Concentrated solar energy 57 can pass from the outside into the radiant energy capture system 16-25, 58-67, however radiant energy within this structure is reflected back into the structure. The material used in the windows 19 and 20 may be quartz glass. Purified water 16 also flows upward between the outer and inner windows 19 and 20 respectively. This water keeps the glass cool while absorbing energy from thermal conduction and thermal radiation. FIG. 4 also shows the construction struts consisting of inner strut 59, outer strut 58, and center strut 60 which are detailed in FIG. 5 and FIG. 6. These construction struts form part of the radiant energy capture unit 16-25, 58-67 structure and act to hold and join the one way mirrored glass pains 19 and 20 together.

Figure 5:
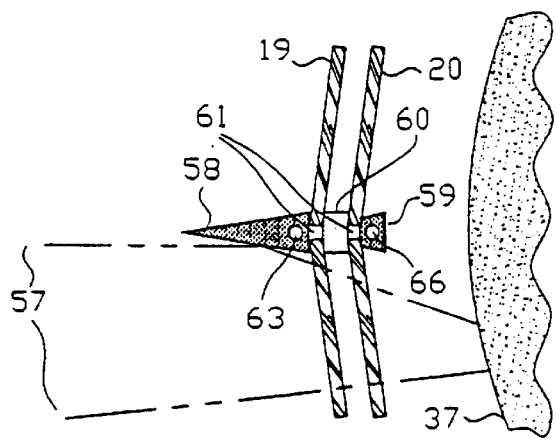
FIG. 5 shows a top down view detail of the one way window and strut design of the radiant energy capture unit.

FIG. 5 shows a top down view detail of the one way window and strut design of the radiant energy capture unit. The flat quartz glass one way mirrored glass pains 19 and 20 are joined with silicon rubber seals 61. These seals may be made of any material which can form a water tight seal, withstand hot water temperatures, and afford some pliability so small movements may occur due to thermal expansion and contraction. Center strut 60 is a spacer strut which holds the outer glass pain 19 and inner glass pain 20 apart. Strut 60 remains cool since water is present on both sides of the strut.

Outer strut 58 is shaped so that incident concentrated solar energy hitting it is reflected into the radiant energy capture unit 16-25, 58-67 and onto target 37. The struts shape is long and pointy so that incident angles of the concentrated solar energy 57 is reflected at a low reflective angle and therefore enters the radiant energy capture unit 16-25, 58-67. A shorter strut with less angle would result is the concentrated solar energy 57 being reflected away from the radiant energy capture unit 16-25, 58-67. This strut may be constructed of micro polished stainless steel or other material which is highly reflective and a thermal conductor. Chrome plating of the strut would make it highly reflective. Inner cooling channel 63 within the strut 58 allows water to pass through it to keep it cool. Water moves from the bottom of the strut to the top of the strut by thermal convection. In some embodiments, the hotter the strut becomes, the more water passes through it. The inner cooling channel 63 within strut 58 may be of any shape and may even contour to the general outside shape of the strut. This contouring could provide better cooling to the strut.

Inner strut 59 is shaped so that radiant energy from the target 37 is reflected back to target 37 within the radiant energy capture unit 16-25, 58-67. This strut may be constructed of micro polished stainless steel or other material which is highly reflective and a thermal conductor. Chrome plating of the strut would make it highly reflective. Inner cooling channel 66 within the strut 59 allows water to pass through it to keep it cool. Water moves from the bottom of the strut to the top of the strut by thermal convection. The hotter the strut becomes, the more water passes through it. The inner cooling channel 66 within strut 59 may be of any shape and may even contour to the general outside shape of the strut. This contouring could provide better cooling to the strut.

Figure 6:
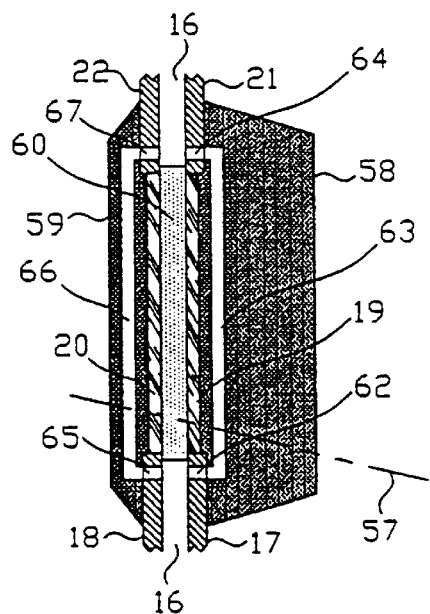
FIG. 6 shows the side view detail of the one way window and strut design of the radiant energy capture unit.

FIG. 6 shows the side view detail of the one way window and strut design of the radiant energy capture unit 16-25, 58-67. The flat quartz glass one way mirrored glass pains 19 and 20 are sandwiched between outer strut 58, middle strut 60, and inner strut 59. Center strut 60 is a spacer strut which holds the outer glass pain 19 and inner glass pain 20 apart. Strut 60 remains cool since water is present on both sides of the strut.

The water cooling channel 63 can be seen on outer strut 58. Water is drawn by thermal convection through port 62, is then moved up channel 63 within strut 58 by thermal convection, and finally exit at port 64. In like manner, cooling water is pulled into the inner strut 59 through port 65. The water then moves up channel 66 within inner strut 59 by thermal convection and finally exits port 67.

Figure 7:
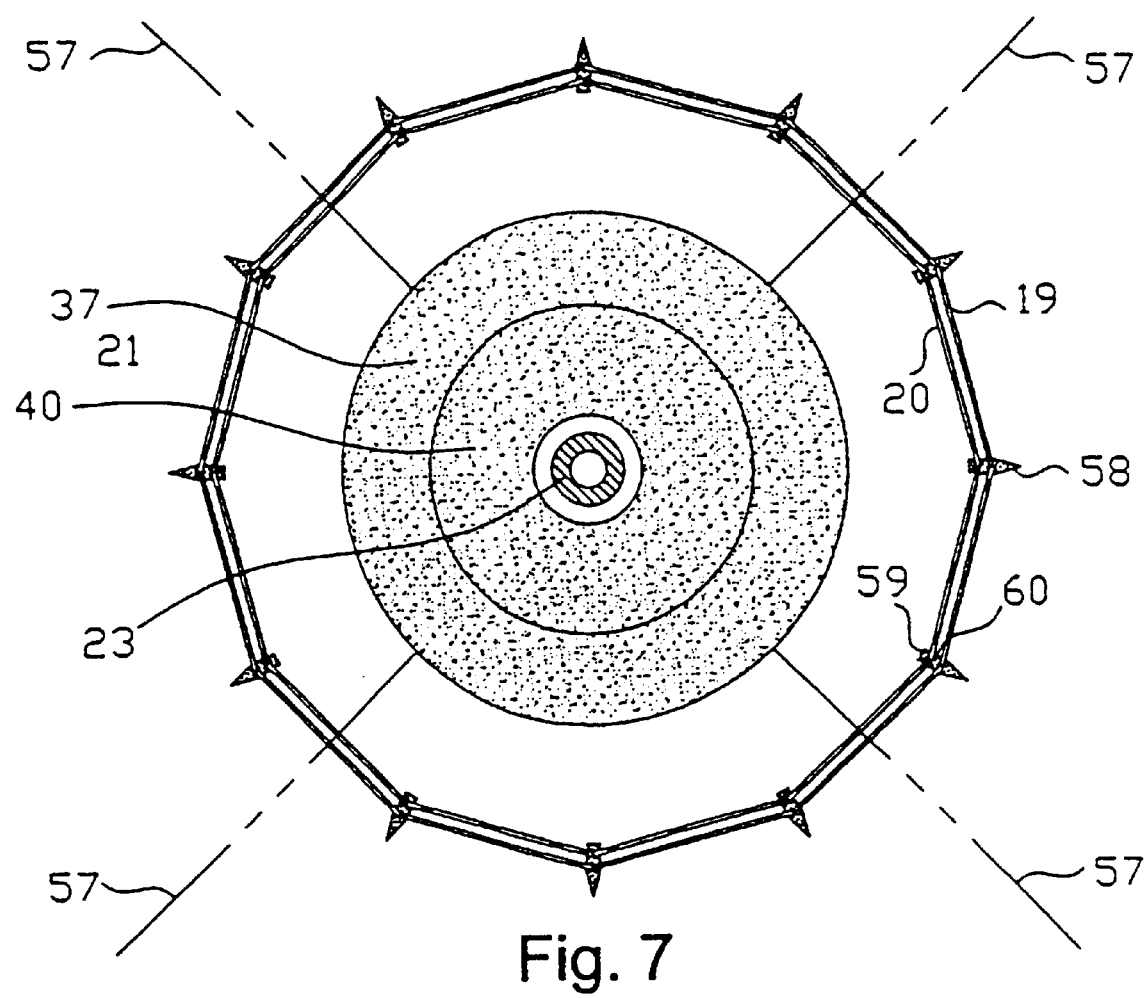
FIG. 7 shows the top down view of the solar hydrogen tower with the top dome removed. The center support structure, reactor core, and solar target are visible in the center. Surrounding this reactor assembly is one embodiment of the one way window and strut design based on flat glass components.
Figure 7A:
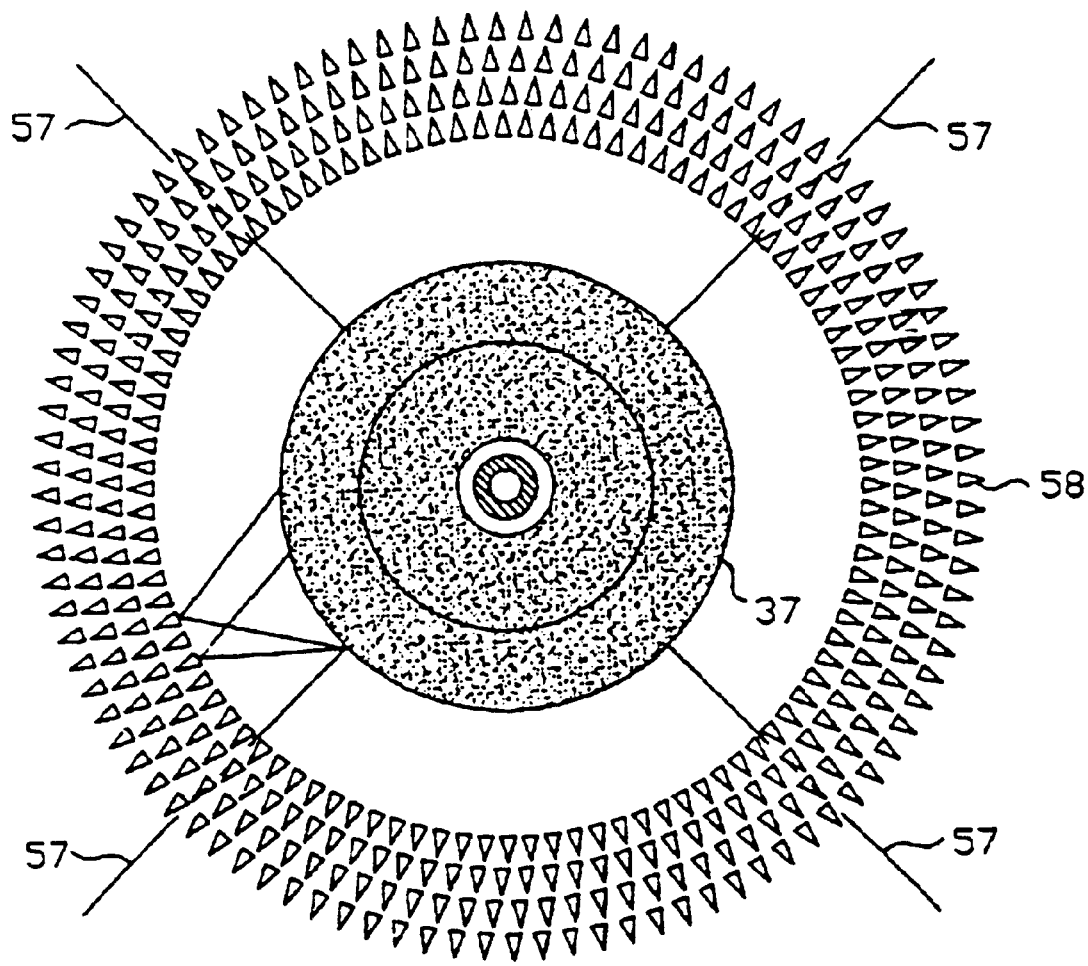
FIGS. 7A and 7B show shaped prisms, or shaped reflectors d58.
Figure 7B:
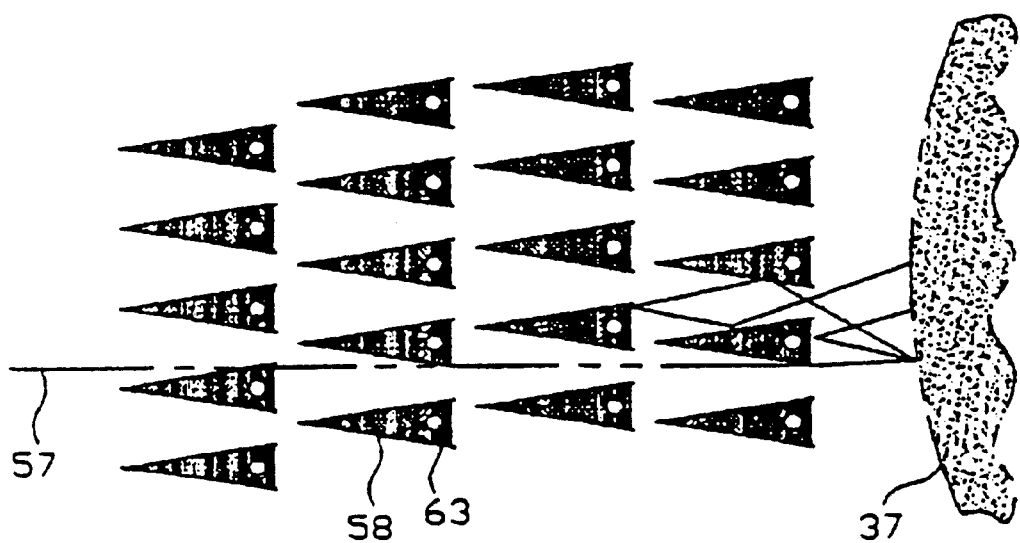

FIG. 7 shows the top down view of the solar hydrogen tower with the top dome removed. The center support structure 23, reactor core section 40, and solar target 37 are visible in the center. Surrounding this reactor assembly is one embodiment of the one way window and strut design based on flat glass components. Outer "one way quartz glass mirrors" 19 surrounds the outer perimeter of the radiant energy capture unit 16-25, 58-67. Inner "one way quartz glass mirrors" 20 are also visible. The outer struts 58, inner struts 59, and center struts 60 are also visible. The number of these struts may vary depending on the design and size of the radiant energy capture unit 16-25, 58-67. Concentrated solar energy 57 comes in from all sides to heat the reactor core target 37 evenly on all sides.

Figure 8:
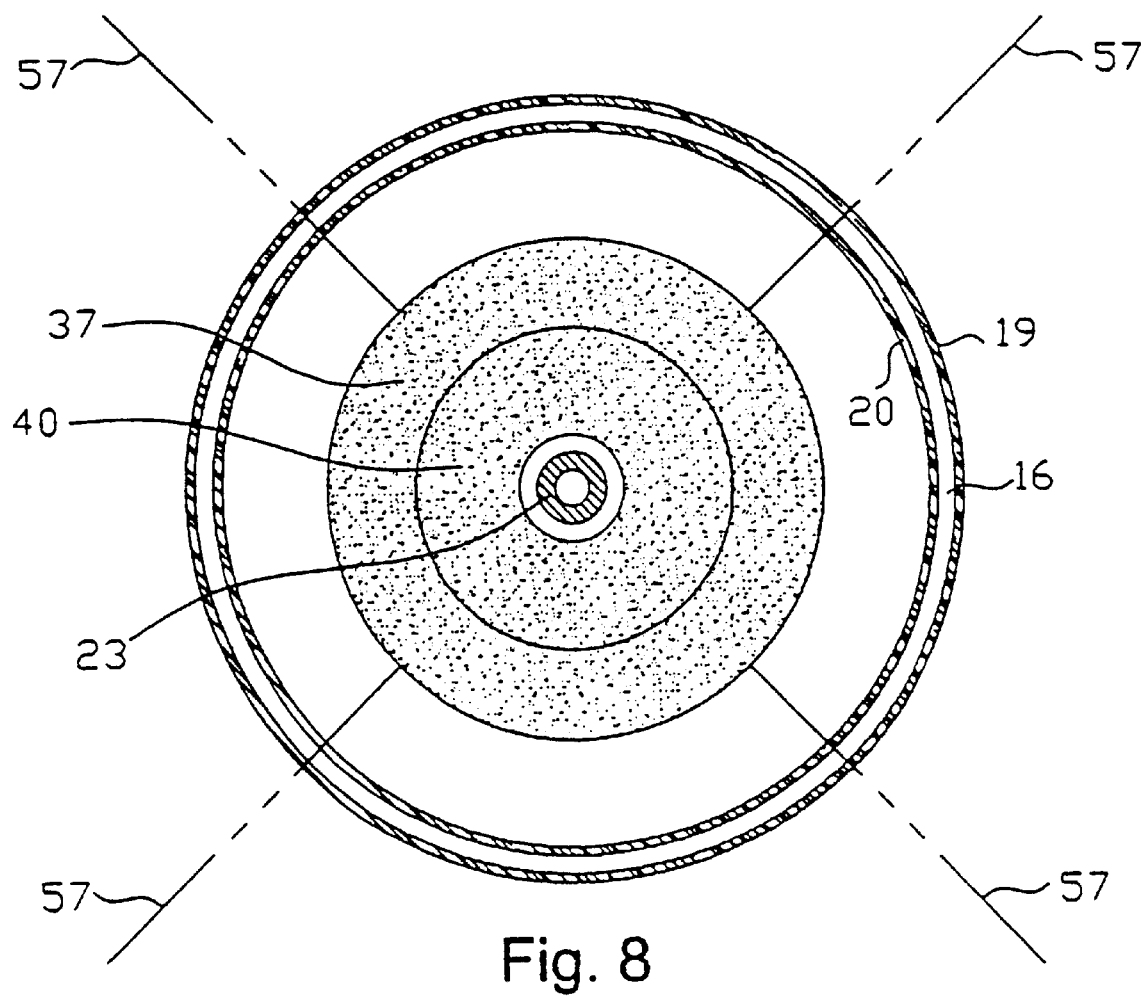
FIG. 8 shows the same view as FIG. 7 but shows another embodiment of the glass structures in which struts are not required and the tapered one way glass cones form the structural members as well as radiant energy capture windows.

FIG. 8 shows the same view as FIG. 7, but shows another embodiment of the glass structures in which struts are not required and the tapered one way mirrored glass cones 19 and 20 form the structural members as well as the radiant energy capture windows. This embodiment simplifies the complexity by not requiring the unique strut design as shown in FIG. 7. The outer tapered one way mirrored quartz glass cone 19 allows concentrated solar energy 57 to enter. The concentrated solar energy 57 then passes through the cooling water stream 16 and then through the inner tapered one way mirrored quartz glass cone 20. The water stream 16 sandwiched between outer cone 19 and inner cone 20, keeps the outer cone 19 and inner cone 20 cool. Any energy absorbed by the outer cone 19, or inner cone 20, or water stream 16, is added to the process in the form of preheating the water for further downstream processing.

Figure 9:
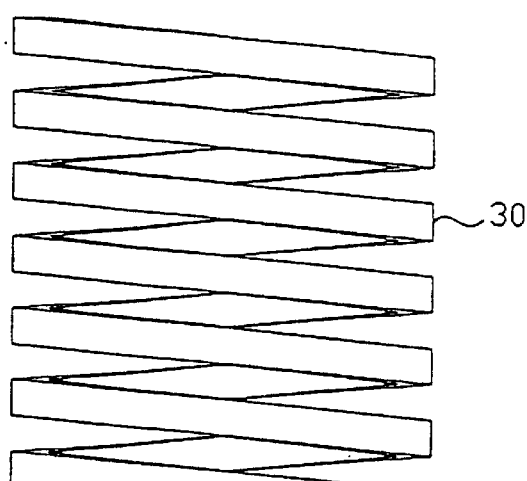
FIG. 9 shows the helical channel which represents the path that the water and its products take within the heat exchanger of FIG. 10.
Figure 10A:
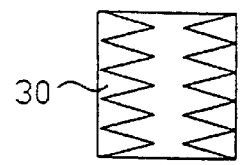
FIGS. 10A, 10B, 10C, 10D show other embodiments of the fluid transfer channels with increased surface area for better thermal transfer characteristics.
Figure 10B:
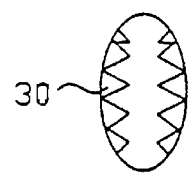
Figure 10C:
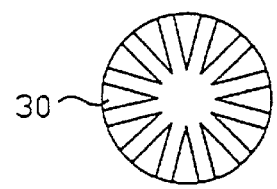
Figure 10D:
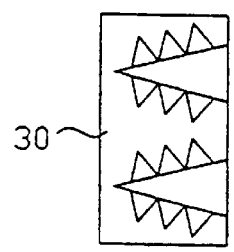
Figure 10:
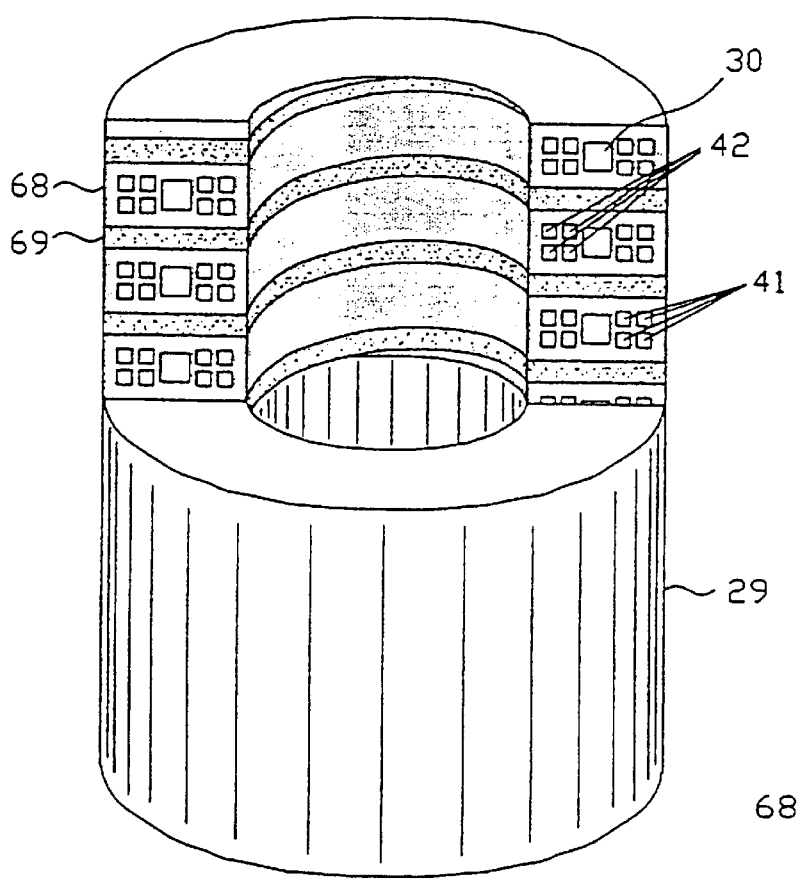
FIG. 10 shows preferred embodiment of the construction of the high temperature heat exchanger which has the helical water feed channel feeding up the center path of the exchanger and the counter-flow smaller helixes feeding the products of hydrogen and oxygen down. Also shown is the thermal break preventing a thermal short circuit.

FIG. 9 shows a helical channel 30 which represents the path that the water and its products may take within the heat exchanger of FIG. 10. The helix is basically the shape of a spring. FIG. 9 shows a rectangular or square structure to the helix; however, any cross sectional shape is possible such as circular, elliptical or other.

FIG. 10 shows an embodiment of the high temperature heat exchanger 29 which has the helical water feed channel 30 helixing up the heat exchanger 29 multiple helix structure. The helix may provide a large thermal transfer area in a small volume of space. The helix may also provide centrifugal force, forcing the water and steam to press against the outer walls of in-feed helix 30. The force of the water and steam pressing against the inside of in-feed helix 30 may increase the thermal transfer of beat from the thermally conductive material 68 which forms the helix material. The out-flow smaller helixes 41 and 42 feeds the products of oxygen and hydrogen down the helixes in an opposite direction to the in-flow water and steam of helical cannel 30. These out-flow helixes 41 and 42 are adjacent and effectively parallel to the in-feed helix 30. Four oxygen out-flow helixes 41 and four hydrogen out-flow helixes 42 are shown in FIG. 10. These helixes are in parallel to each other. The number of out-flow helixes is not critical; however, a larger number would be preferable to effectively act as thermal transfer conduits of the higher volume of exhaust gases of oxygen in out-flow helix 41 and hydrogen in the out-flow helix 42. In general, a larger number of out-flow helixes 41 and 42, will provide better thermal transfer. The inside surfaces of the in-flow helix 30, and outflow helixes 41 and 42 do not necessarily have to have be square, circular, or rectangular shapes. The cross sectional shapes of in-flow helix 30 and out-flow helixes 41 and 42 can be such that the surface area is significantly increased as is shown in FIGS. 10A, 10B, 10C, and 10D. This increased surface area results in more effective thermal transfer to the thermally conductive material 68.

Material 68 may in alternative embodiments be any suitable thermally conductive material which can withstand the high temperatures required in heat exchanger 29. Typical materials can include thermally conductive ceramics such as oxides of zirconia and many others (the patents mentioned previously herein include disclosures of relevant materials, and they are all hereby incorporated by reference). The material 69 shown in FIG. 10 is a thermally insulative material which is able to withstand the high temperatures required for the high temperature heat exchanger 29. Typical insulating material may include oxides of aluminum, or any other material suitable for this application. The thermal insulating material 69 prevents thermal short circuits of the adjacent coils of the thermally conductive material 68 of the helix structure. Material 69 forms a thermal insulating barrier to prevent thermal short circuits in helix material 68.

In one embodiment, a means of manufacturing the high temperature heat exchanger 29 may be by the process of investment casting. The internal hollow shapes of high temperature heat exchanger 29 may be constructed of machinable wax. The materials for constructing the high temperature heat exchanger 29 are poured around these wax shapes. The ceramic material may be available as a powder which mixes with a liquid binder material forming a slurry. The material is layered together to form alternate layers of conductive material 68 and insulating material 69. In some embodiments, the machinable wax material may not support its own weight for the entire length of the helix, in which case it may be constructed in stages. It may however be necessary in some embodiments to assemble the unit 29 quickly, so that the ceramics are still in the green state. This may be required so that the material 68 and 69 will fuse together when later sintered. After the entire structure is assembled, which would not necessarily only include the high temperature heat exchanger 29, but may also include other components of the reactor, then the ceramic material would be allowed to harden. After hardening, the structure would be heated to allow the internal wax shapes to melt out. The design of the entire shape would be such that the wax would flow out without any pockets of wax pooling in any of the structure. Once the wax is melted out, then the entire structure would be sintered. An alternative method of manufacturing may be to use light cured liquid polymers in which a three dimensional (3D) model of the entire structure is constructed in a computer. A computer program may be used to slice the 3D model layer by layer, and using a LASER, trace the pattern of that layer within the polymer. The LASER light would cause that layer of polymer to harden. Layer upon layer of hardened polymer would build the shape of the total internal hollow structures within the entire ceramic structure. The ceramics would then be poured in the appropriate layers around the entire hardened polymer structure. Once the ceramics hardened, then the polymer would be melted out of the structure, and the remaining ceramics would be sintered. Another alternative method of manufacturing may be to machine solid blocks of the ceramic material.

FIGS. 10A, 10B, 10C and 10D show various alternative shapes of the internal structures of helixes 30, 41 and 42 of FIG. 10. These shapes may be a way to effectively increase the surface area of the internal structures and therefore increase thermal transfer to and from the fluids flowing through these structures. The tooth shaped protrusions may be wider near the walls of the fluid flow channel such as helical channel 30 in FIG. 10B and narrows as it protrudes towards the center of the channel. The wider base provides more thermal transfer material in a similar way that heat sinks are designed for cooling electronic equipment. These protrusions may have further protrusions on them to further increase its surface area as is detailed in FIG. 10D. These various alternative shapes of the structures for helixes may be used in alternative embodiments of helixes 30, 41 and 42 of the high temperature heat exchanger in FIG. 10. These shapes may also be used in helix 31 of the $1^{st}$ stage solar reactor of FIG. 18, and helix 35 of the $2^{nd}$ stage solar reactor of FIG. 20.

Figure 11:
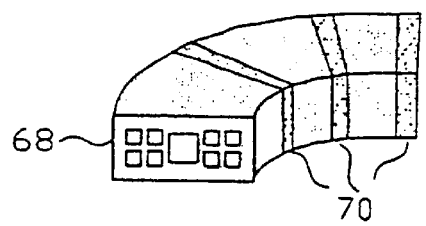
FIG. 11 shows a detail of another embodiment of the heat exchanger. A section of the helix of FIG. 10 in which thermal breaks are evident along the path of the helix.

FIG. 11 shows a detail of another embodiment of the high temperature heat exchanger 29 in FIG. 10. A section of the helix of FIG. 10 is shown in FIG. 11 in which thermal breaks are evident along the path of the helix. These thermal breaks consist of thermally insulating materials 70 which could be the same material 69 of FIG. 10.

Figure 12:
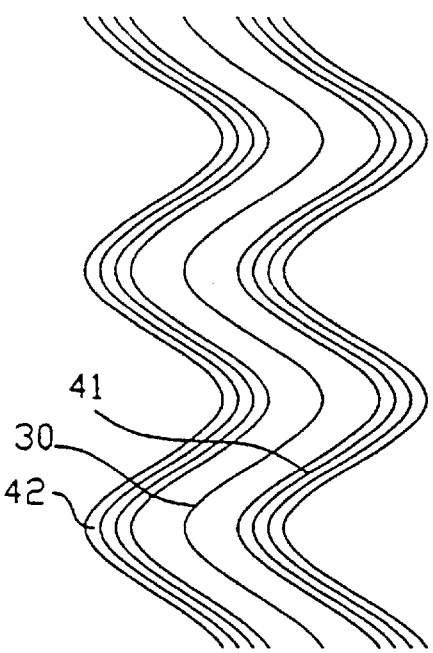
FIG. 12 shows a line path representation of the FIG. 10 heat exchanger. The wavy lines represent the helixes as shown in FIG. 10 with the center line being the water in-feed line feeding up and the four lines on each side being the hydrogen and oxygen out-feed lines feeding down.

FIG. 12 shows a line path representation of the preferred embodiment of the FIG. 10 high temperature heat exchanger 29. The wavy lines represent the helixes as shown in high temperature heat exchanger 29, with the center line being the water in-feed channel 30 feeding up, and the four lines on each side being the hydrogen channel 42 and oxygen channel 41 feeding down. This arrangement is a parallel helix arrangement. This line path representation of the parallel helix is to provide a reference when discussing other embodiments in FIG. 13 and FIG. 14, of the high temperature heat exchanger 29 of FIG. 10.

Figure 13:
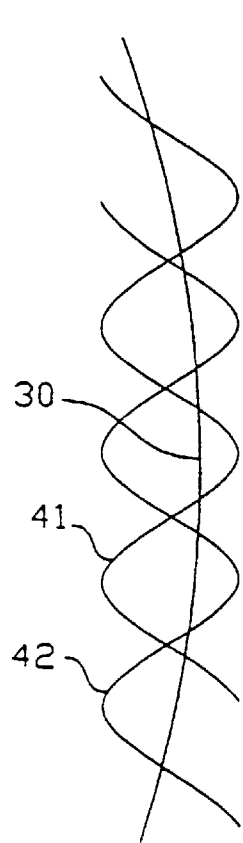
FIG. 13 shows another embodiment of the heat exchanger of FIG. 10 in which a double helix out-feeding hydrogen and oxygen, helix around the water in-feed helix, forming a compound helix.

FIG. 13 shows another embodiment of the high temperature heat exchanger of FIG. 10 in which a double helix consisting of out-feed hydrogen channel 42 and out-feed oxygen channel 41, helix around the water in-feed helix 30, forming a compound helix. In this embodiment the volume of out-flow gases of hydrogen and oxygen is larger than the in-flow water and steam, without having to parallel channels as is done in FIG. 12.

Figure 14:
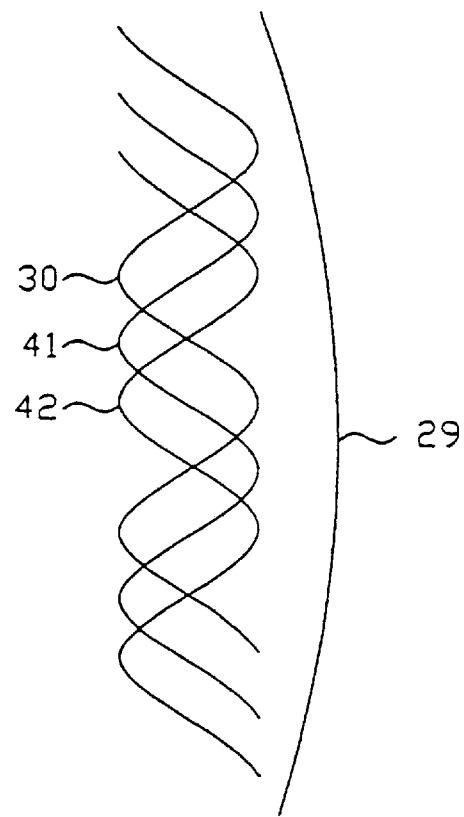
FIG. 14 shows another embodiment of the heat exchanger of FIG. 10 in which a triple helix exists and this triple helix, helixes around the exchanger, forming a compound helix.

FIG. 14 shows another embodiment of the high temperature heat exchanger of FIG. 10 in which a triple helix exists. This triple helix, helixes around the exchanger, forming a compound helix. Another variation of these is to have non-compounded triple helix arrangements in parallel to each other, which are similar in arrangement to the $3^{rd}$ stage solar reactors 36 of FIG. 26. These smaller helixes would result in more centrifugal force. Smaller helixes could also be used in other embodiments of the high temperature heat exchanger 29 of FIG. 10, the $1^{st}$ stage solar reactor 32 of FIG. 18, and the $2^{nd}$ stage solar reactor 34 of FIG. 20. Other embodiments be possible.

Figure 15:
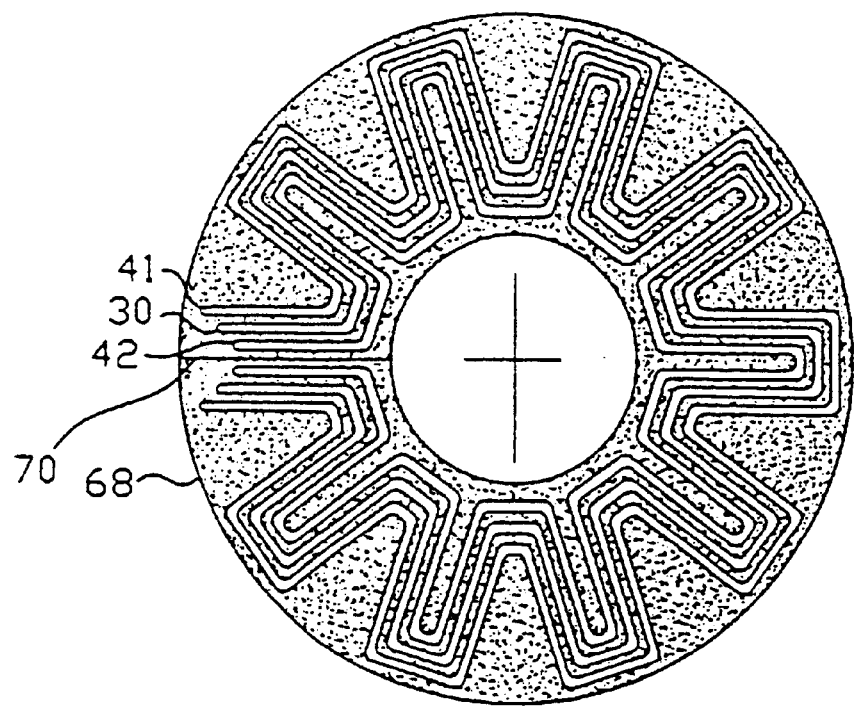
FIG. 15 shows a top down view of another embodiment of the heat exchanger of FIG. 10 in which the thermal transfer channels are on one flat layer as opposed to being helical.

FIG. 15 shows a top down view of another embodiment of the high temperature heat exchanger 29 of FIG. 10 in which the thermal transfer channels are on one flat layer as opposed to being helical. In this embodiment of the high temperature heat exchanger, thermally conductive material 68 forms a disk in which the fluid channels are machined. A thermal break 70 which can consist of thermally insulating material, or an air gap, prevents a thermal short circuit within the high temperature heat exchanger disk. Water and steam in-feed channel 30 is placed between oxygen out-feed channel 41 and hydrogen out-feed channel 42. The water and steam in channel 30 flows in the opposite direction of the oxygen and hydrogen in channels 41 and 42. A number of these high temperature heat exchange disks are connected in series as shown in the side view of FIG. 16.

Figure 16:
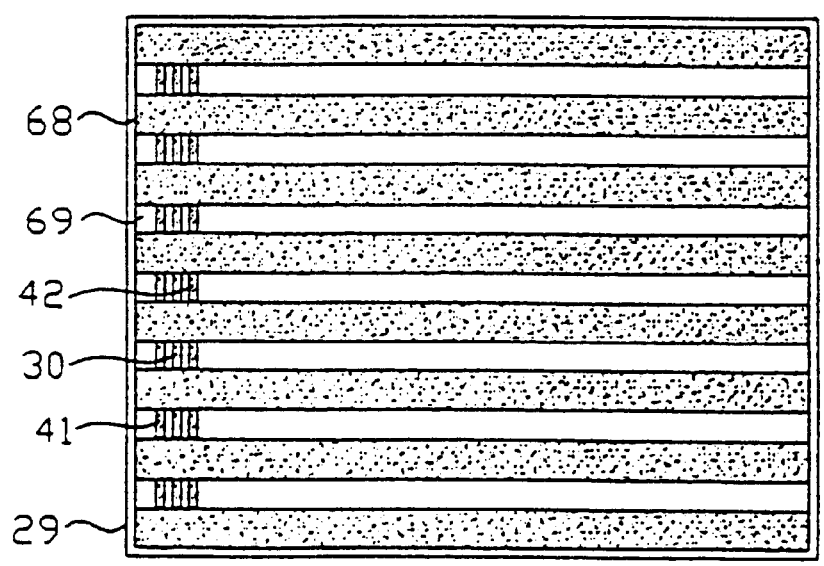
FIG. 16 shows a side view of FIG. 15. Each flat layer is connected to another layer separated by a thermal break layer thus preventing a thermal short circuit.

FIG. 16 shows a side view of FIG. 15 which is another embodiment of the high temperature heat exchanger 29 of FIG. 10. Each heat exchange layer consisting of thermally conductive material 68 is connected to another layer by the same high temperature material in channel 30, 41 and 42. Each layer is separated by a thermal break layer consisting of thermally insulating material 69 thus preventing a thermal short circuit.

Figure 17:
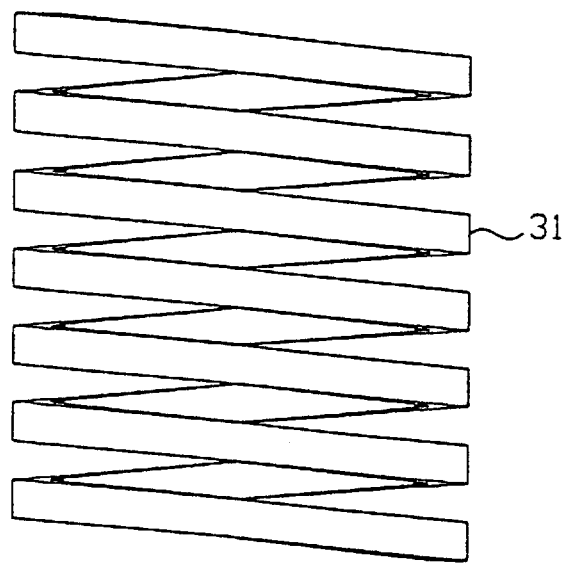
FIG. 17 shows the helical path within the $1^{st}$ stage solar reactor shown in FIG. 18 shows a cutaway view of the $1^{st}$ stage solar reactor.
Figure 18:
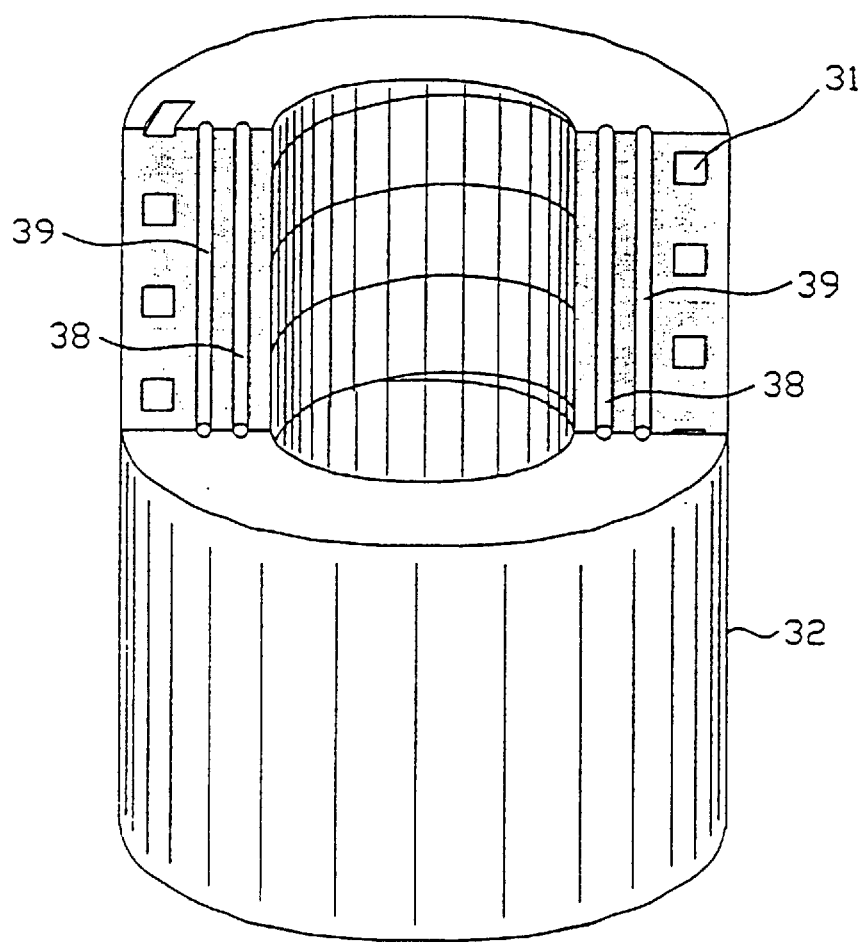

FIG. 17 shows the helical channel 31 within the $1^{st}$ stage solar reactor shown in FIG. 18. This helical channel is similar to the helical channel 30 of the high temperature heat exchanger 29 of FIG. 10. Variations of this helical channel 31 can have the same variations as shown in FIGS. 10A, 10B, 10C, and 10D.

FIG. 18 shows a cutaway view of the $1^{st}$ stage solar reactor 32. The entire structure may be made of the same thermally conductive material. The superheated steam from the high temperature heat exchanger 29 of FIG. 10 enters the bottom of the $1^{st}$ stage solar reactor 32. The steam helixes up channel 31. The centrifugal force of the helical motion of the steam causes it to press against the outer walls of channel 31, and therefore increases the thermal transfer efficiency of heat from the thermally conductive material of which the $1^{st}$ stage reactor is made. This could be the same material as the thermally conductive material 68 of high temperature heat exchanger 29 of FIG. 10. The steam is also under pressure to further increase its thermal transfer efficiency. This pressure is maintained by the orifice 33 of FIG. 1 and FIG. 2, and pressurization pump 27 of FIG. 1 and FIG. 2. High temperature gas exit channels 38 and 39 of FIG. 18 are for the out-flow gases of hydrogen and oxygen respectively from further along in the process.

Figure 19:
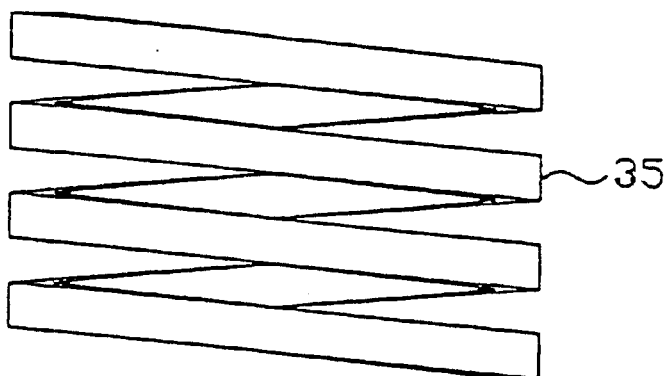
FIG. 19 shows the helical path within the $2^{nd}$ stage solar reactor shown in FIG. 20.
Figure 20:
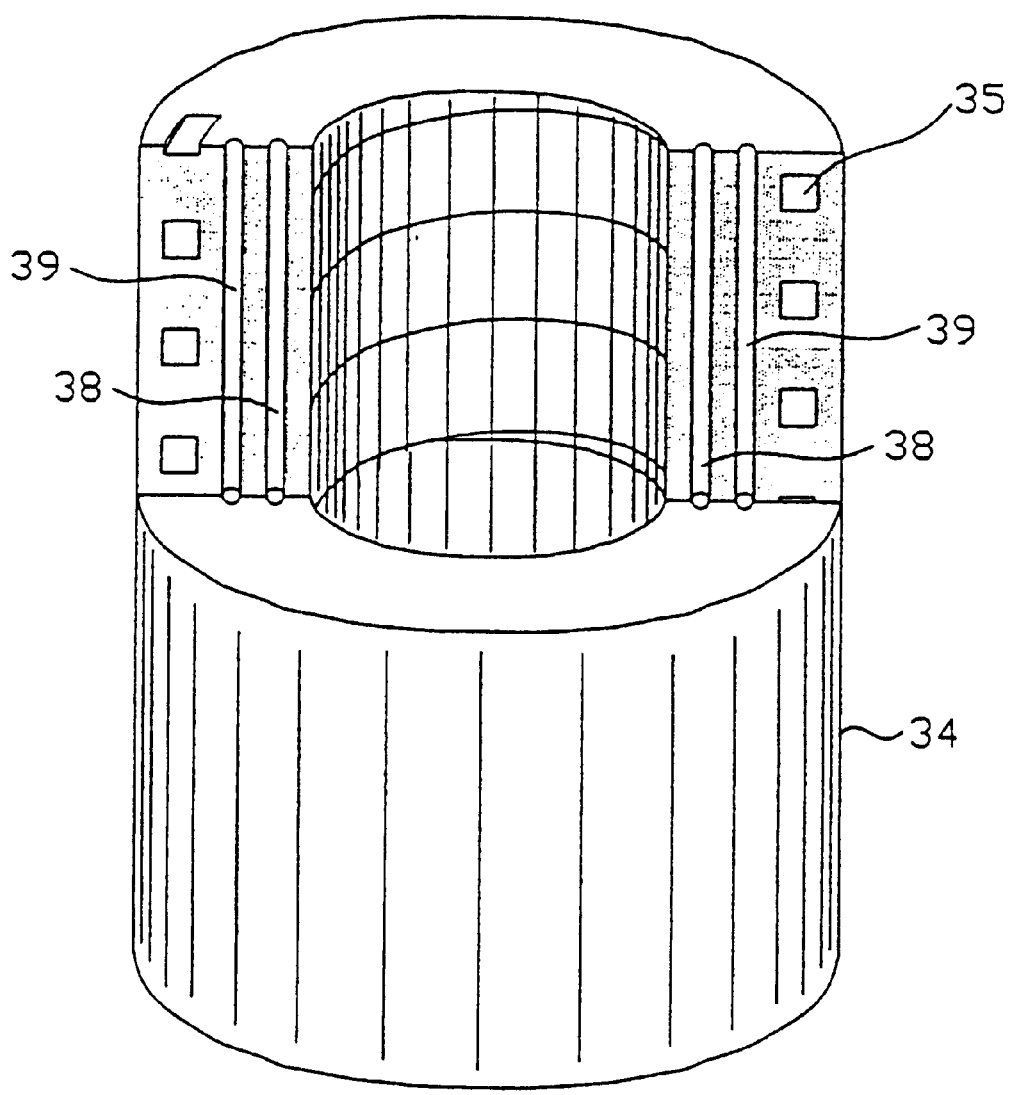
FIG. 20 shows cutaway view of the $2^{nd}$ stage solar reactor.

FIG. 19 shows the helical path 35 within the $2^{nd}$ stage solar reactor shown in FIG. 20. This helical channel is similar to the helical channel 31 of FIG. 18, and the helical channel 30 of the high temperature heat exchanger 29 of FIG. 10. Variations of this helical channel 35 can have the same variations as shown in FIGS. 10A, 10B, 10C, and 10D. In another embodiment of the $2^{nd}$ stage reactor 34, the helical channel 35 can also have a catalyst material placed within the steam flow channel 35. This catalyst may have the effect of causing the steam to disassociate at lower temperatures. Platinum, platinum group or other catalyst alloys are possible.

FIG. 20 shows a cutaway view of the $2^{nd}$ stage solar reactor. Helical channel 35 can be seen going up near the outside edge of the thermally conductive reactor material. Since the concentrated solar energy 57 of FIG. 2 bombards the outer edge of the reactor cores 32, 34 and 36 of FIG. 2, it is desirable to have the helix near the outer edge as can be seen in $1^{st}$ stage reactor of FIG. 18 and the $2^{nd}$ stage reactor of FIG. 20.

Superheated steam from the $1^{st}$ stage solar reactor 32 of FIG. 18 enters the bottom of the $2^{nd}$ stage solar reactor 34 after passing through orifice 33 of FIG. 1 and FIG. 2. The steam helixes up channel 35 of the $2^{nd}$ stage solar reactor. The centrifugal force of the helical motion of the steam causes it to press against the outer walls of channel 35 and therefore increases the thermal transfer efficiency of heat from the thermally conductive material of which the $2^{nd}$ stage reactor is made (such as the same material as the thermally conductive material 68 of high temperature heat exchanger 29 of FIG. 10). The steam may also be under partial vacuum which may lower the equilibrium temperatures. This partial vacuum may be maintained by the orifice 33 of FIG. 1 and FIG. 2 and vacuum pumps 49 and 52 of FIG. 1 and FIG. 2. The introduction of catalyst material within channel 35 of the $2^{nd}$ stage solar reactor 34 of FIG. 20 may further lowers the equilibrium temperature. High temperature gas exit channels 38 and 39 of FIG. 20 are for the out-flow gases of hydrogen and oxygen respectively from further along in the process.

Figure 21:
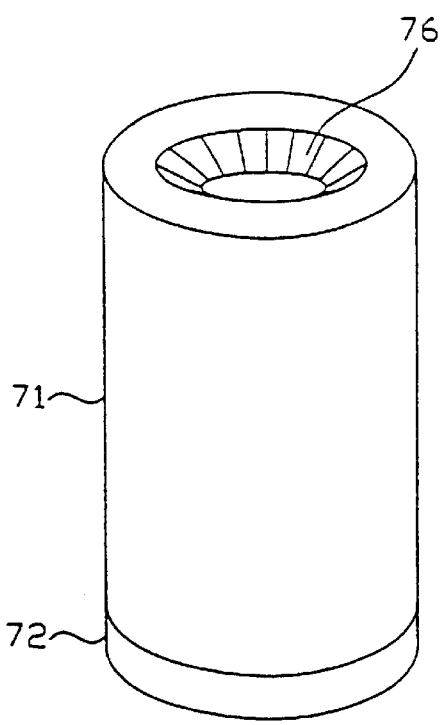
FIG. 21 shows the pictorial view of the outside of the vortex tube within the $3^{rd}$ stage reactor.
Figure 22:
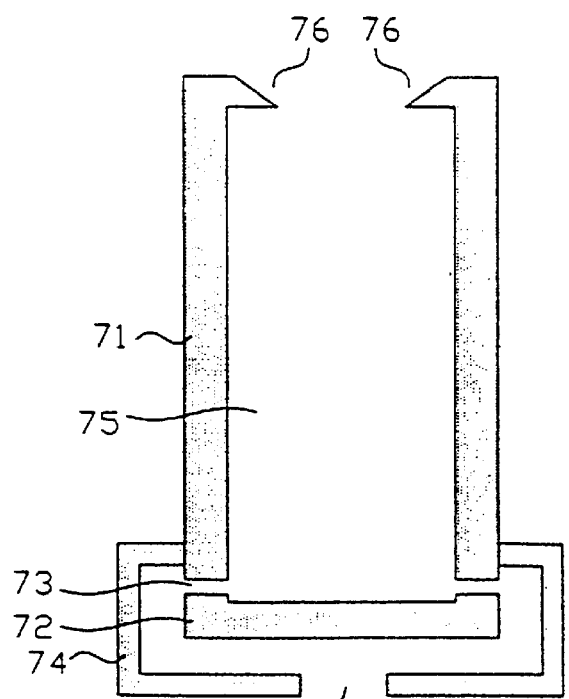
FIG. 22 shows a cross sectional side view of the vortex tube within the $3^{rd}$ stage solar reactor with the in-feed manifold.
Figure 23:
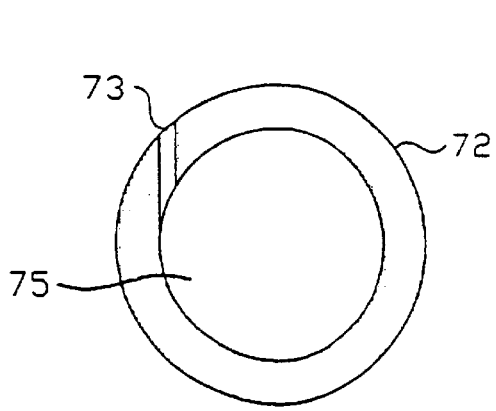
FIG. 23 shows the detail of an injector nozzle of the vortex tube within the $3^{rd}$ stage solar reactor.
Figure 24:
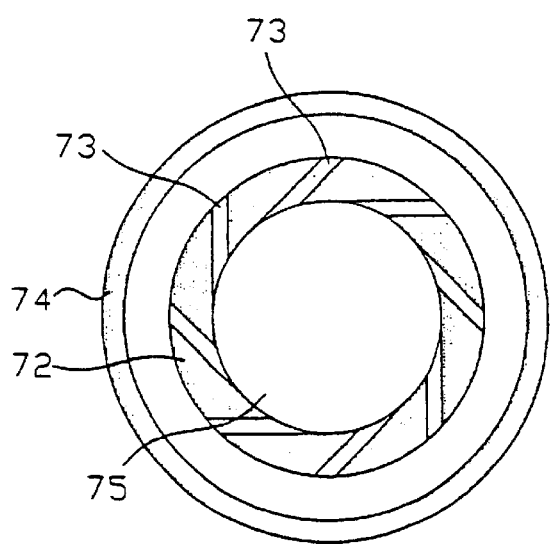
FIG. 24 shows the detail view of another embodiment of the vortex tube within the $3^{rd}$ stage reactor showing more than one injector and showing the in-feed manifold.

FIG. 21 shows the pictorial view of the outside of the vortex tube 71 of the $3^{rd}$ stage solar reactor 36. Also visible from this outside view are the vortex spin nozzle 72 and oxygen spill gate 76. FIG. 22, FIG. 23, and FIG. 24 show cross sectional views of this vortex tube.

FIG. 22 shows a cross sectional side view of the vortex tube 71 within the $3^{rd}$ stage solar reactor 36 with the in-feed manifold 74. The equilibrium mixture of partially disassociated steam from the $2^{nd}$ stage solar reactor channel 35 of FIG. 20, enters the manifold 74. The manifold directs the equilibrium mixture, primarily consisting of steam (but also with hydrogen, oxygen and hydroxyl's), to vortex spin nozzle 72 in which injector paths 73 injects the steam on a tangent into the vortex tube 71. This steam 75 vortexes or helixes around the inside of vortex tube 71 and exits at the oxygen spill gate 76. Further details of the processes within the vortex tube will be explained in FIG. 25.

FIG. 23 shows the end view detail of one embodiment of an injector nozzle of the vortex tube's $3^{rd}$ stage solar reactor. FIG. 23 shows injector nozzle 72 with one injector port 73. In this particular drawing, the steam entering through injector port 73, spins around the inside of the vortex tube 72 in a counter clockwise direction. It is possible to modify the design for a clockwise direction spin. The direction of rotation is not a factor in the overall embodiment of the invention. The steam migrates down the inside 75 of the vortex tube 71 of FIG. 22.

FIG. 24 shows the detailed view of another embodiment of the vortex tube $3^{rd}$ stage reactor showing more than one injector 73 and showing the in-feed manifold 74. Experimental testing has shown that the number of injectors may not significantly affect the operation of various embodiments of the vortex tube, although it may increase the amount of steam which can pass through the tube. In various embodiments, 1 to 8 injectors have been used. In such embodiments, the amount of steam flow is increased nearly proportionately to the number of injectors.

Figure 25:
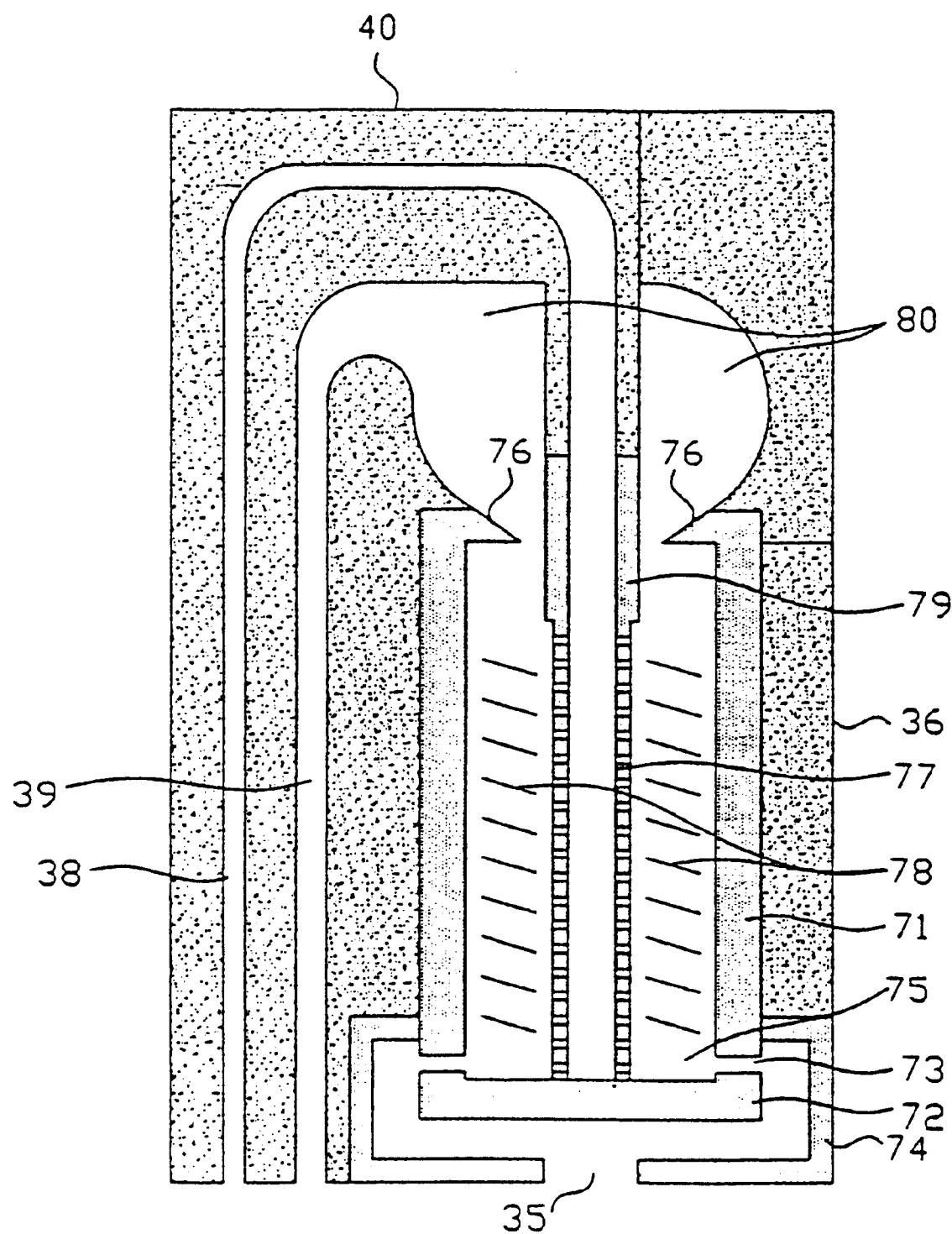
FIG. 25 shows the preferred embodiment of the detail construction of the $3^{rd}$ stage solar reactor which incorporates the vortex tube.

FIG. 25 shows an embodiment of the detailed construction of the $3^{rd}$ stage solar reactor 36 of FIG. 2 which incorporates the vortex tube. The materials used in the $3^{rd}$ stage solar reactor of FIG. 25 may be high temperature thermally conductive ceramics or other materials capable of handling high temperatures. Similar materials may be used in other sections of the invention such as the $1^{st}$ and $2^{nd}$ stage solar reactors of FIG. 18 and FIG. 20 respectively and portions of the high temperature heat exchanger 29 as shown in FIG. 10. Different shading is shown in FIG. 25 to make visibly apparent, the vortex tube and its components within the $3^{rd}$ stage solar reactor, even though the same material is used throughout.

The equilibrium mixture of partially disassociated steam from the $2^{nd}$ stage solar reactor channel 35 of FIG. 20 enters the manifold 74 of FIG. 25. The manifold directs the equilibrium mixture, primarily consisting of steam (but also with hydrogen, oxygen and hydroxyl's), to the vortex spin nozzle 72 in which injector paths 73 injects the steam on a tangent into the vortex tube 71. This steam 75 vortexes or helixes around the vortex tube 71 and exits at the oxygen spill gate 76. While this steam is propagating from the injector nozzles 73 to the oxygen spill gate 76, it does so in a helical or vortex fashion. This vortex action causes centrifugal force on the equilibrium mixture 75. This centrifugal force causes the equilibrium mixture to stratify with the heavier components of oxygen migrating to the outside circumference of the vortex tube 71, while the lighter products of hydrogen migrate towards the center of the vortex tube 71.

Hollow draw tube 77 is porous to hydrogen and draws off the hydrogen through small holes or perforations. In the illustrated embodiments, porous portions are provided throughout the length of the hydrogen draw tube, except for section 79 of the draw tube. Hydrogen is drawn out through high temperature pipe 38. Section 79 of draw tube 77 is adapted to help prevent the oxygen concentration near the oxygen spill gate 76 from being drawn into the draw tube 77. The removal of hydrogen shifts the equilibrium of the reaction mixture, forcing more steam and hydroxyl's to disassociate into more hydrogen and oxygen in order to maintain an equilibrium balance at temperature. Concentrated solar energy 57 of FIG. 2 is thermally conducted and radiated from the target 37 to the $3^{rd}$ stage solar reactor 36. The outside surface of the $3^{rd}$ stage solar reactor 36 surrounds the vortex tube 71 as can be seen in FIG. 25. A continual supply of thermal energy is required in the $3^{rd}$ stage solar reactor of FIG. 25 because the continuous disassociation of steam into hydrogen and oxygen requires a continuous supply of energy. Although much of the energy is provided in the $1^{st}$ and $2^{nd}$ stage solar hydrogen reactors, a further boost is provided in the $3^{rd}$ stage solar reactor.

This equilibrium upset in the $3^{rd}$ stage solar reactor is preferably adapted to cause a higher percentage of disassociation than would otherwise be achievable. This feature may be used to reduce the amount of recycle and therefore reduce the amount of lost energy in the process. This also increases the throughput of the system as a result of less recycle.

Oxygen left in the vortex tube 71 of FIG. 25 may spill over the oxygen spill gate 76. The angle of the spill gate exit is preferably such that it follows the natural flow which the exit gases want to take. The exit angle of the oxygen spill gate in one embodiment is shown in FIG. 25, as has been experimentally determined. Other angles may also work. The oxygen which is spilled over the oxygen spill gate 76 is drawn into chamber 80. Chamber 80 is shaped so not to interfere with the transitional flow of the oxygen from the oxygen spill gate 76 to the high temperature oxygen exit pipe 39. Chamber 80 is adapted to prevent flow disruption which would otherwise impede the vortex within the vortex tube 71.

In an illustrative example of the process of the invention, a steel vortex tube reactor 71 as illustrated in FIGS. 21 through 24 was fitted with a brass hydrogen draw tube, as illustrated schematically in FIG. 25, and a mixture of hydrogen and nitrogen gasses was introduced into the reactor tangentially, forming a vortex. A vacuum was applied to the draw tube and an ignitable gas stream enriched in hydrogen gas was pulled from the axial region of the vortex using the draw tube. An enriched nitrogen gas stream was obtained from spill gate 76.

In another embodiment of the vortex tube 71, a catalyst material 78 can be placed within the equilibrium mixture 75 to facilitate lower temperature disassociation of the steam. In one test, a platinum catalyst on ceramic tube substrates was used to lower the temperature required for dissociation to about 1,300° C., and in another test with a different catalyst conformation to 1,426° C. (the reactor was not acting to support a vortex at the time of either test). Vapor flow is preferably not disturbed by the catalyst structure 78, so that stratification is not disrupted. In one embodiment, the catalyst material is deposited on a ceramic structure which helixes in the same path as the steam flow 75 through the vortex tube 71.

The partial vacuums created by the process balancing pumps 49 and 52 of FIG. 1 and FIG. 2 may result in lower temperatures being required to obtain the same level of equilibrium concentrations of steam, hydrogen, oxygen and hydroxyl's. Un-reacted hydroxyl's may later recombine with oxygen or hydrogen to form water during the cooling process in the high temperature heat exchanger of FIG. 10.

Figure 25A:
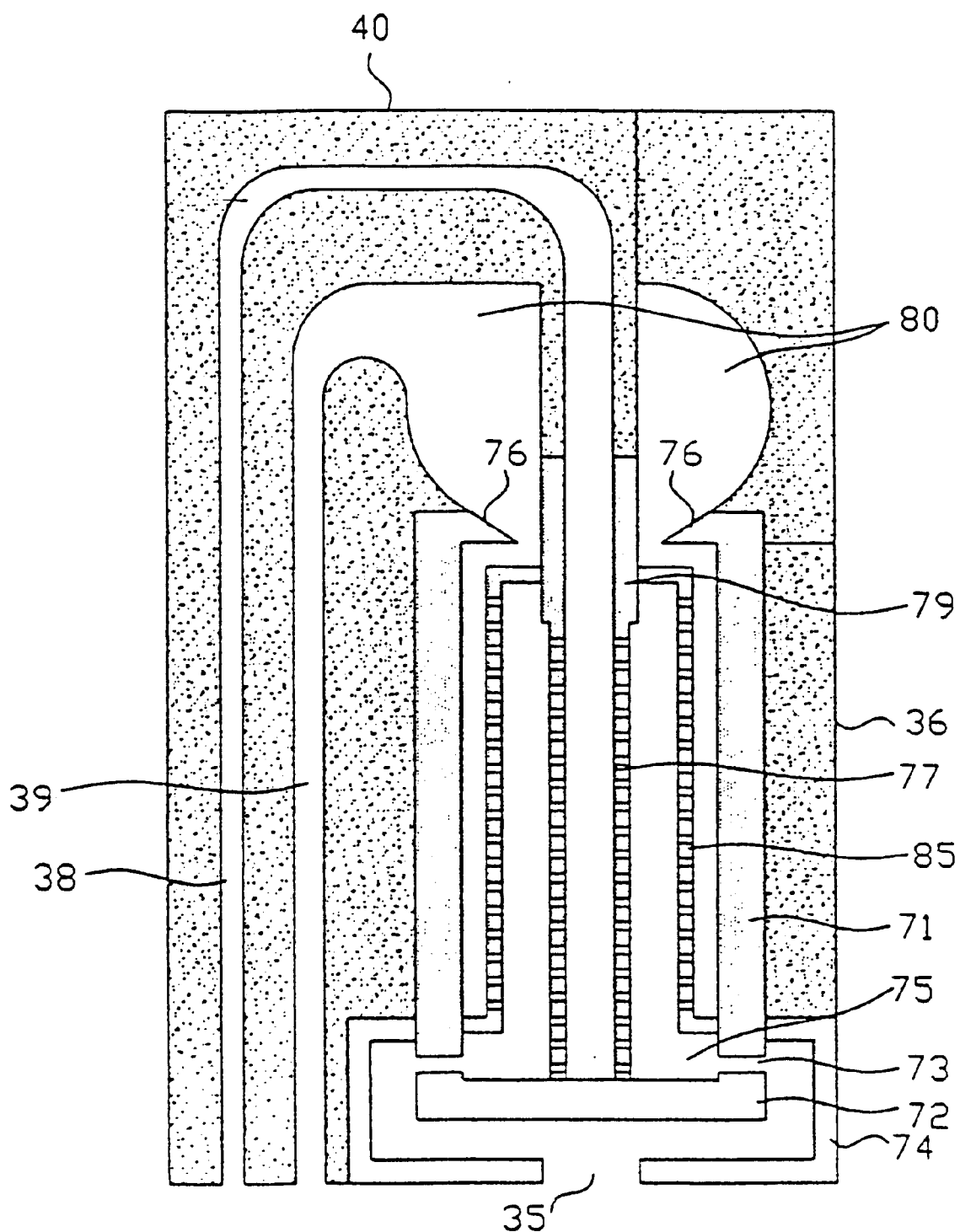
FIG. 25A shows another embodiment of the $3^{rd}$ stage solar reactor with an additional oxygen draw tube.

FIG. 25A shows another embodiment of the $3^{rd}$ stage solar reactor in which an oxygen draw tube 85 is placed in the vortex tube 71. Oxygen is removed from the periphery of the vortex tube 71. Upset equilibrium can occur with the removal of either or both of hydrogen and oxygen.

Figure 26:
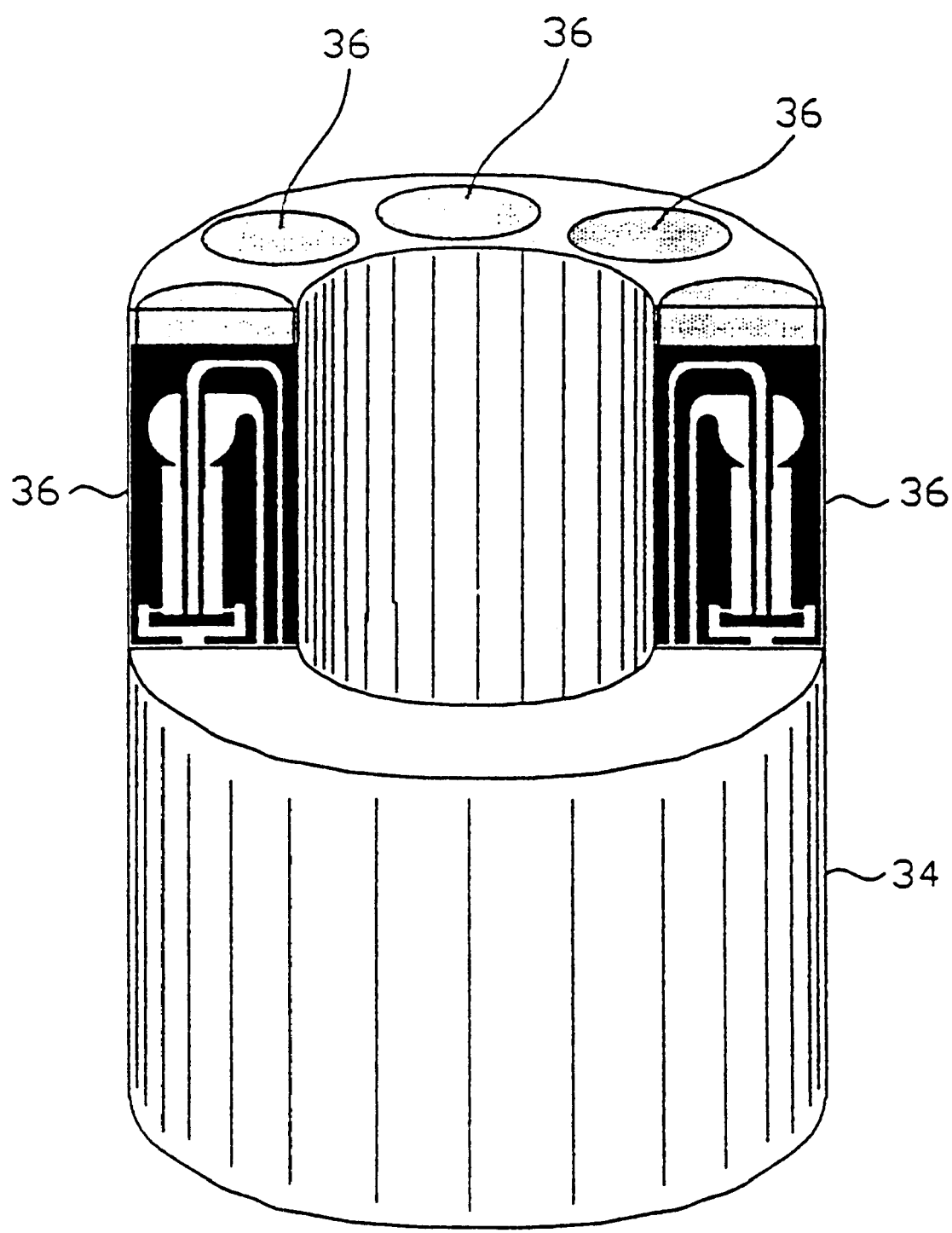
FIG. 26 shows a cutaway view of a plurality of vortex tubes assemblies within the $3^{rd}$ stage solar reactor and mounted on top of the $2^{nd}$ stage solar reactor.

FIG. 26 shows a cutaway view of a plurality of vortex tube assemblies within the $3^{rd}$ stage solar reactor 36 and mounted on top of the $2^{nd}$ stage solar reactor 34. FIG. 26 illustrates eight $3^{rd}$ stage solar reactors mounted within the cylindrical shape on top of the $2^{nd}$ stage solar reactor. The relatively small inside diameter of the vortex tubes within the $3^{rd}$ stage solar reactors 36 may be adapted to provide high centrifugal forces to stratif the equilibrium reaction mixture. In some embodiments, smaller diameter vortex tubes generate significantly higher centrifugal force for the same volume of product steam compared to larger diameter vortex tubes; however, stratification may be very poor with some embodiments of small diameter vortex tubes. In some embodiments, larger diameter vortex tubes offer superior stratification. In some embodiments, angular velocities of the steam in the vortex tube can be far less than molecular velocity of the steam when used in larger diameter vortex tubes.

Figure 27:
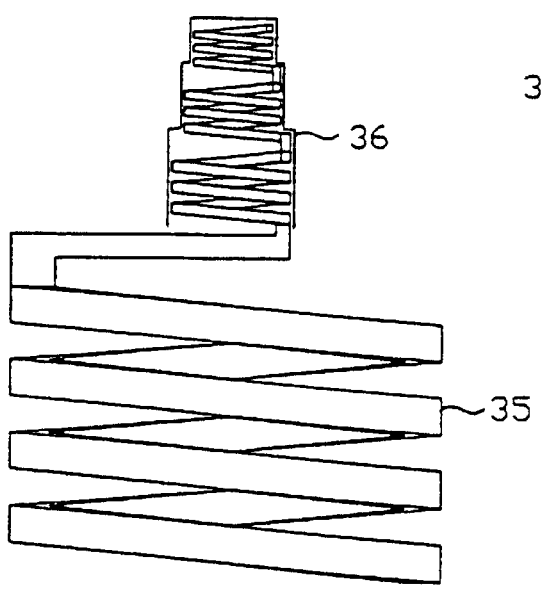
FIG. 27 shows another embodiment of the $3^{rd}$ stage solar reactor positioned in relation to the $2^{nd}$ stage solar reactor helix.
Figure 28:
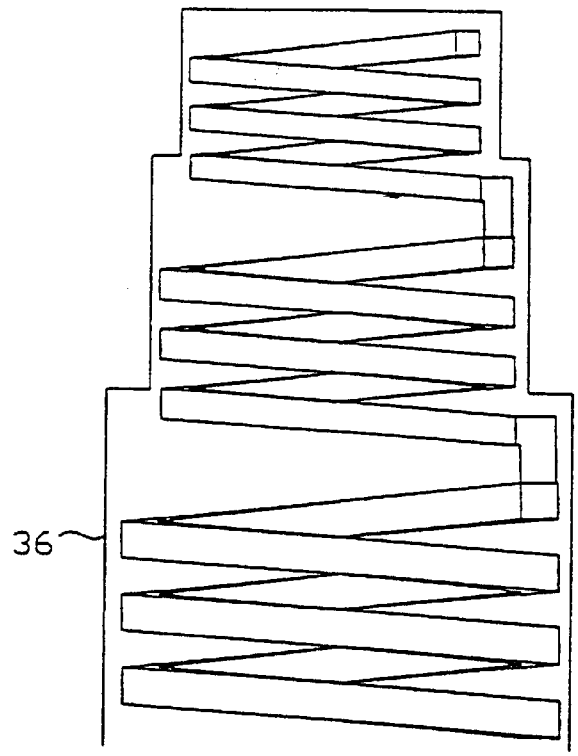
FIG. 28 shows a close up side view of another embodiment of the $3^{rd}$ stage solar reactor shown in FIG. 27.
Figure 29:
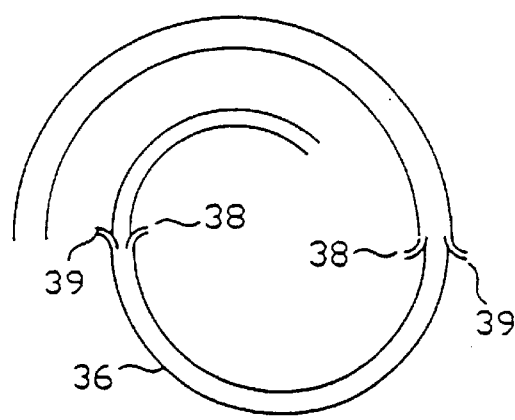
FIG. 29 shows a top down view of the $3^{rd}$ stage solar reactor embodiment as described in FIG. 28.

FIGS. 27, 28, 29 shows another embodiment of the $3^{rd}$ stage solar reactor 36 positioned in relation to the $2^{nd}$ stage solar reactor helix 35. In this embodiment a much smaller diameter helix is provided. The equilibrium mixture of steam, hydrogen, oxygen, and hydroxyl's (steam) stratify as the steam propagates along the helix. As the steam mixture nears the end of the first helix, a set of knives cuts the flow, removing the hydrogen concentration from the inside radius through exit port 38, while the oxygen concentration is removed from the outer radius through exit port 39 as can be seen in FIG. 29 which is the top view of this embodiment.

The intermediate products of steam continue to the next stage as can be seen in FIG. 27 and closeup view FIG. 28 of the $3^{rd}$ stage solar reactor. Three stages are shown in this embodiment; however, more or less can be implemented. FIG. 28 shows that each stage is of lesser diameter than the stage before it. This is because there is less steam and to maintain the velocities within the helix for effective separation, a smaller radius is required. FIG. 28 shows a close up side view of another embodiment of the $3^{rd}$ stage solar reactor shown in FIG. 27. FIG. 29 shows a top down view of the embodiment as described in FIG. 28.

Figure 30:
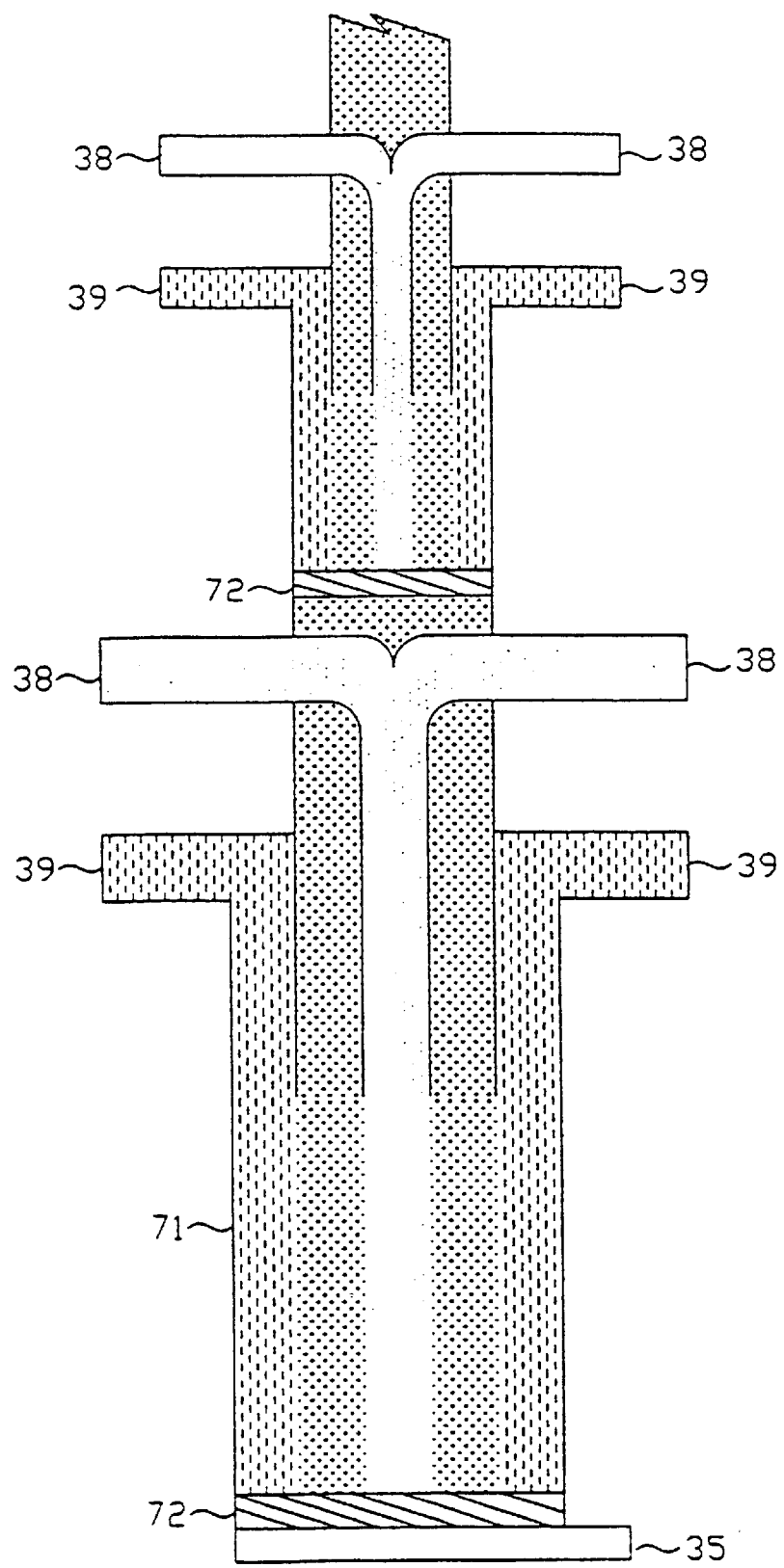
FIG. 30 shows another embodiment of the $3^{rd}$ stage solar reactor.

FIG. 30 shows another embodiment of the $3^{rd}$ stage solar reactor. In this embodiment, an alternative vortex tube is used. In this embodiment, as the reaction mixture of migrates down the vortex tube 71 of the $3^{rd}$ stage reactor 36, from the vortex nozzle 72 toward the hydrogen exit port 38 and oxygen exit port 39, stratification occurs. Circular knives within the vortex flow cut the product of hydrogen from the inside diameter of the flow and exit it through hydrogen exit 38, while the heavier oxygen which has stratified to the outside of the vortex tube is cut and exits through the oxygen exit port 39. The intermediate products of steam and hydroxyl's migrate to the second stage vortex tube which is of smaller diameter since less steam is present and sufficient centrifugal force is required to stratify the steam as it further disassociates into its constituent components. Any number of stages may be used.

Figure 31:
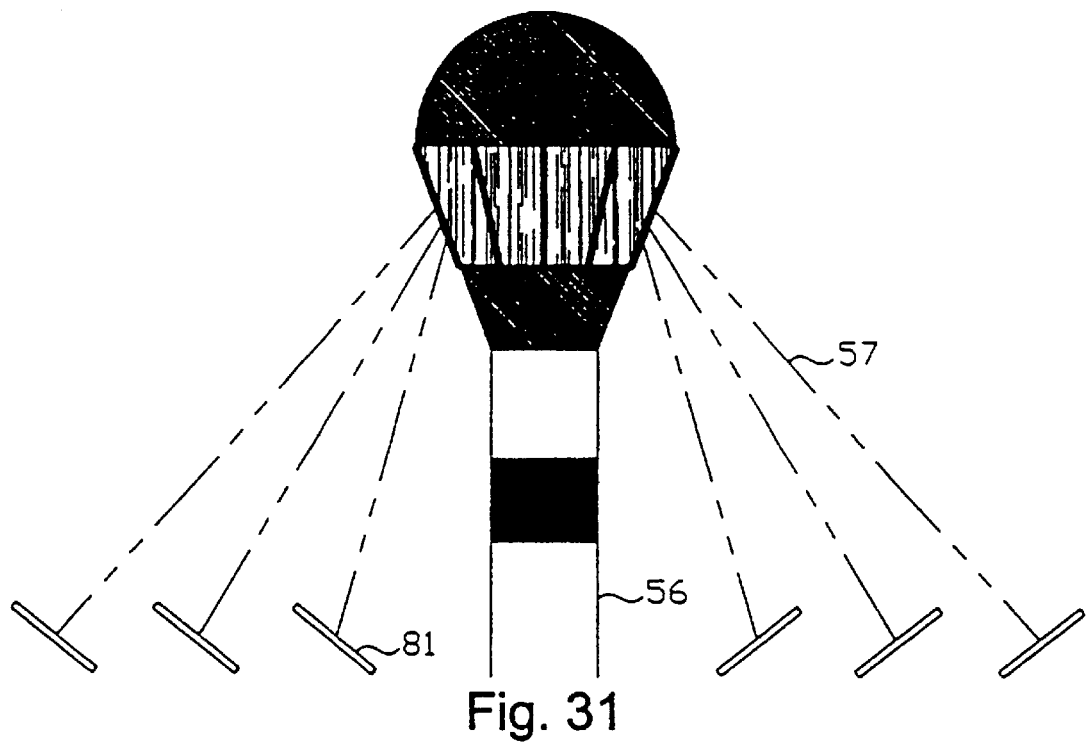
FIG. 31 shows the side view of a typical solar hydrogen station which would be geographically located in the latitudes not far from the equator, where the sun is high in the sky.

FIG. 31 shows the side view of a typical solar hydrogen station which would be geographically located in the latitudes not far from the equator, where the sun is high in the sky. The mirrors 81 track the sun and focus the solar radiation 57 towards the solar reactor dome at the top of tower 56.

Figure 32:
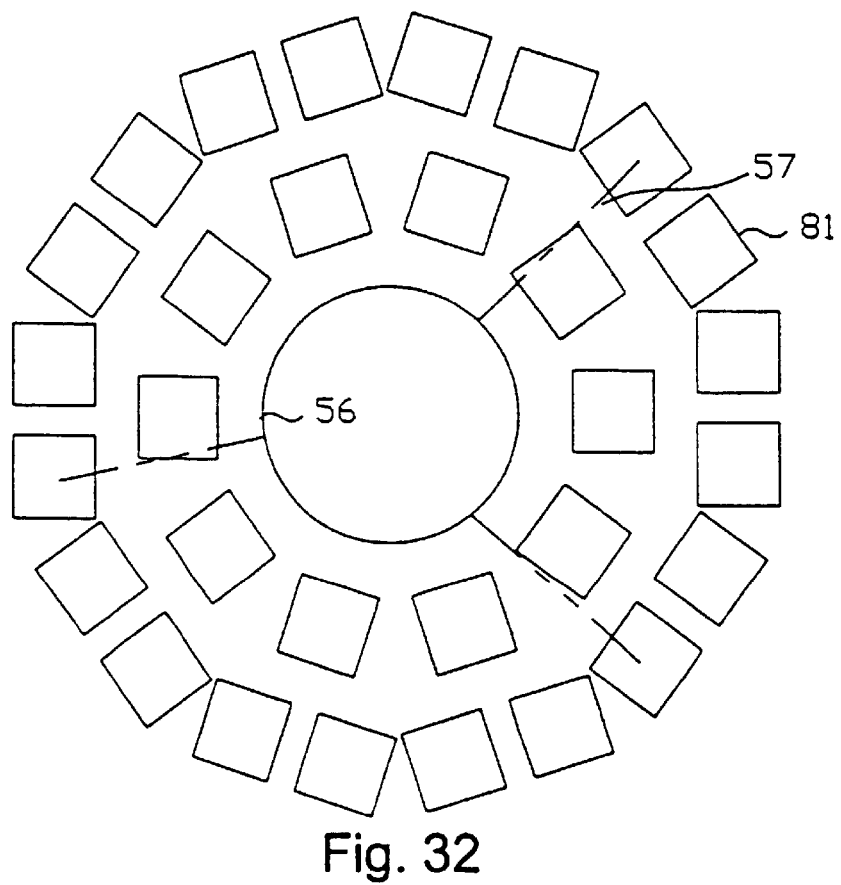
FIG. 32 shows the top down view of FIG. 31.

FIG. 32 shows the top down view of FIG. 31. Computer steered mirrors 81 track the sun to focus solar radiation to the top of tower 56. The mirrors are placed all around the tower.

Figure 33:
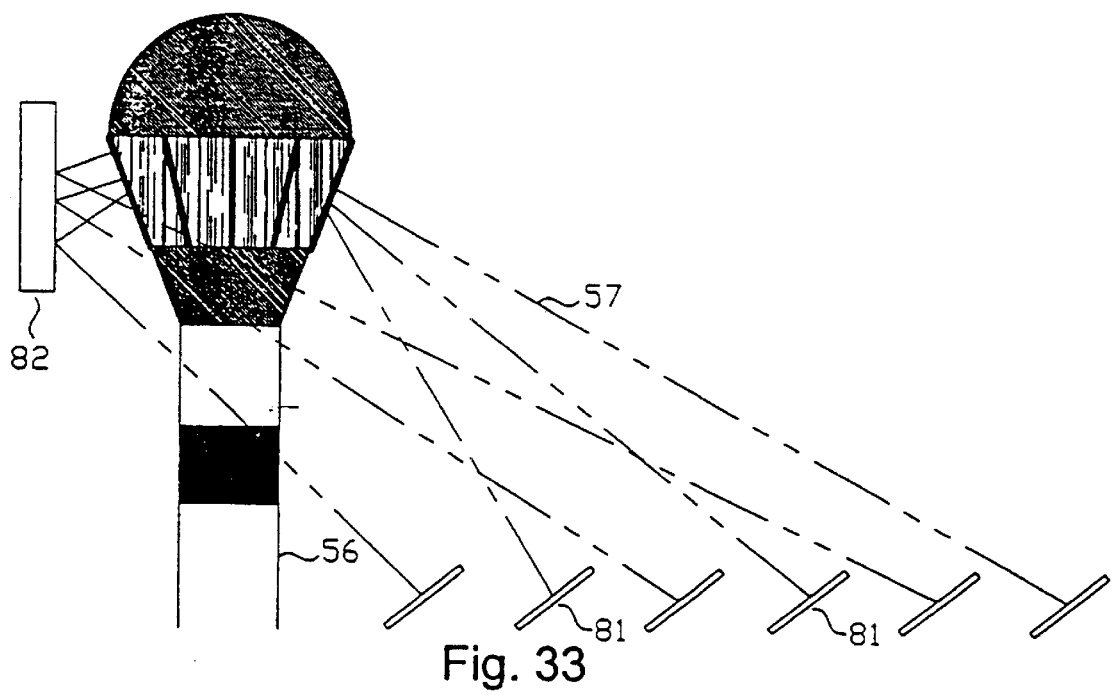
FIG. 33 shows the side view of a typical solar hydrogen station which would be geographically located in the latitudes far from the equator, where the angle of the sun is low on the horizon.

FIG. 33 shows the side view of a typical solar hydrogen station which would be geographically located in the latitudes far from the equator, where the angle of the sun is low on the horizon. The computer steered mirrors would be north of the tower in northern latitudes and south of the tower in southern latitudes. Some of the solar radiation 57 from the mirrors 81 are steered towards mirror 82. Mirror 82 reflects the solar radiation 57 to that part of the tower 56 which would otherwise not receive solar radiation 57. Mirror 82 is shaped to focus the light into the top of tower 56. The amount of solar radiation reflecting off of mirror 82 would be very concentrated. For this reason mirror 82 would be water cooled. The heated water from cooling mirror 82 would be used as a preheat to the process.

Figure 34:
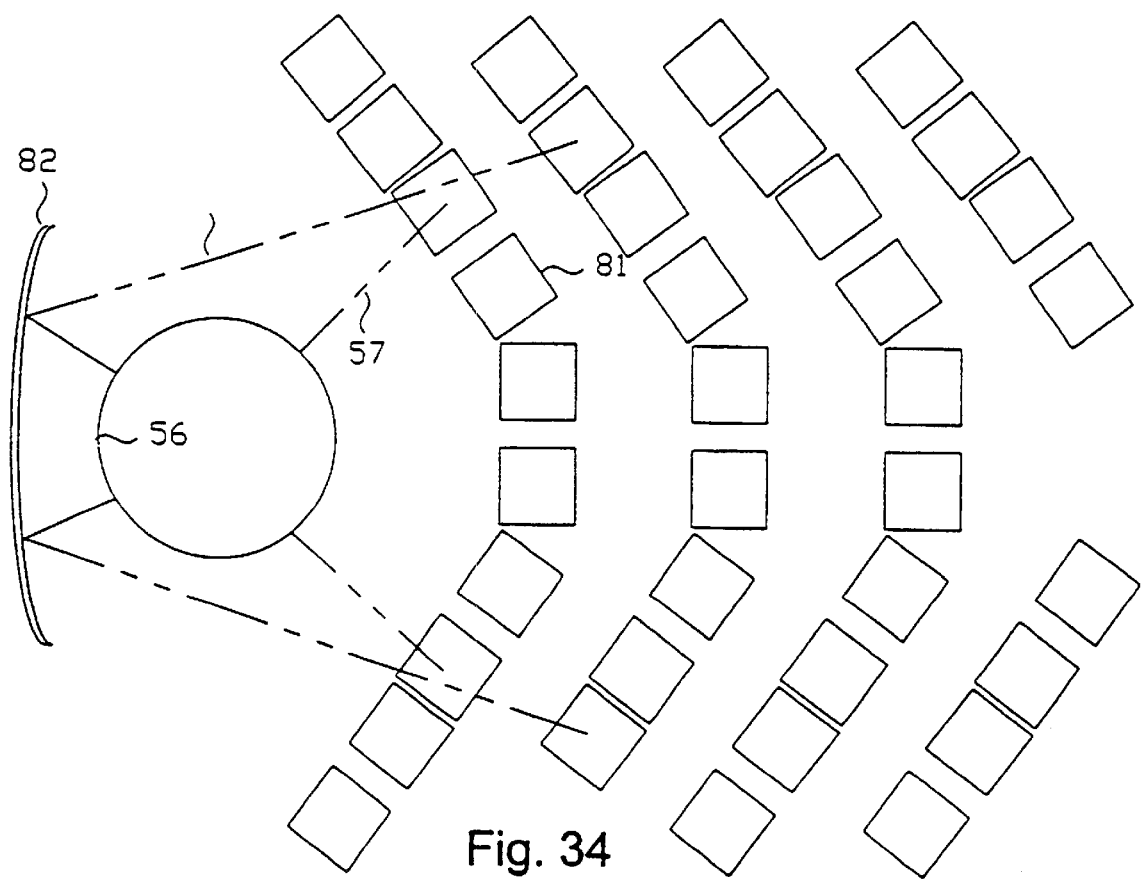
FIG. 34 shows the top down view of FIG. 33.

FIG. 34 shows the top down view of FIG. 33 and shows the special curvature required on mirror 82 to reflect the concentrated solar energy 57 to the dark side of the tower 56.

Figure 35:
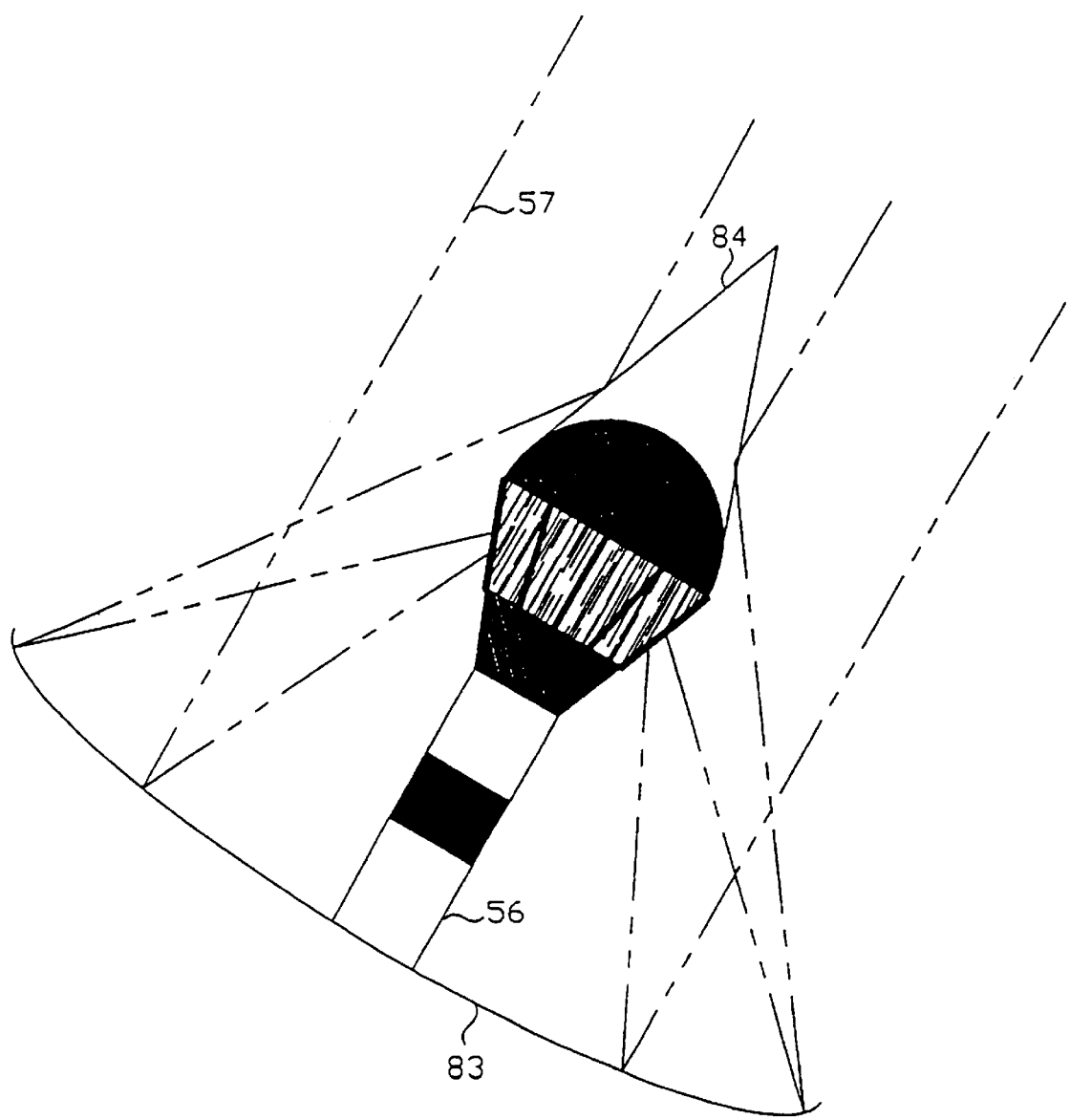
FIG. 35 shows a small scale solar hydrogen station which uses a specially shaped reflective dish and follows the sun directly.

FIG. 35 shows a small scale solar hydrogen station which uses a specially shaped reflective dish and tracks the sun directly. In this scenario, the size of the shadow cast by the tower 56 dome is significant in relation to the size of the collection area mirror 83. A mirrored cone reflector 84 is placed at the top of the dome of tower 56. Cone reflector 84 reflects solar energy 57 so it does not hit the dome, but is reflected to the specially contoured edge of mirror 83. The edge contours of mirror 83 reflect this solar energy 57 into the dome at the top of the tower 56.

What is claimed is:

1. A process for producing hydrogen from water comprising:
   (a) heating water to a water dissociating temperature to form a dissociated water reaction mixture comprising hydrogen gas and oxygen gas;
   (b) forming a vortex of the reaction mixture to subject the reaction mixture to a centrifugal force about a longitudinal axis of an interior space of a vortex tube reactor, so that there is radial stratification of the hydrogen gas and the oxygen gas in the interior space of the vortex tube reactor; and,
   (c) preferentially extracting hydrogen gas from the reaction mixture at spaced apart points along the longitudinal axis of the interior space of the vortex tube reactor.

2. The process of claim 1, wherein the water is heated to a dissociating temperature with concentrated solar radiation focused on the vortex tube reactor.

3. The process of claim 1, wherein the water dissociating temperature is between about 1800° C. and about 3000° C.

4. The process of claim 1, wherein the reaction mixture is contacted with a catalyst that catalyzes the dissociation of the water into hydrogen and oxygen.

5. The process of claim 1 wherein the preferentially extracting step comprises applying a vacuum to extract the gas.

6. A process for producing hydrogen from water comprising:
   (a) heating water to a water dissociating temperature to form a dissociated water reaction mixture comprising hydrogen gas and oxygen gas;
   (b) forming a vortex of the reaction mixture to subject the reaction mixture to a centrifugal force about a longitudinal axis of an interior space of a vortex tube reactor, so that there is radial stratification of the hydrogen gas and the oxygen gas in the interior space of the vortex tube reactor; and,
   (c) preferentially extracting oxygen gas from peripheral portions of the vortex at longitudinally spaced apart points along the circumference of the vortex tube reactor.

7. The process of claim 6 further comprising preferentially extracting hydrogen gas from the reaction mixture at spaced apart points along the longitudinal axis of the interior space of the vortex tube reactor.

8. A vortex tube reactor comprising:
   (a) an elongate wall having first and second ends, the wall and ends together defining an interior space having a longitudinal axis and adapted to house a vortex;
   (b) an inlet port in the first end for tangentially introducing a gas into the interior space to initiate circumferential movement of the gas in the interior space about the longitudinal axis to form the vortex;
   (c) a hydrogen draw tube concentrically located in the interior space along the longitudinal axis, the hydrogen draw tube being porous to hydrogen gas at longitudinally spaced apart points;
   wherein the interior surfaces of the vortex tube reactor comprise a refractory material adapted to withstand a water-dissociating temperature.

9. The vortex tube reactor of claim 8, wherein the water dissociating temperature is between about 1800° C. and 3000° C.

10. The vortex tube reactor of claim 8 further comprising a catalyst positioned to contact the vortex and adapted to catalyze the dissociation of water into hydrogen and oxygen.

11. The vortex tube reactor of claim 8, further comprising a vacuum pump in fluid communication with the draw tube for creating a lower pressure in the draw tube than in the interior pace of the vortex tube reactor.

12. The vortex tube reactor of claim 8, further comprising a means for focusing concentrated solar energy on the vortex tube reactor.

13. A vortex tube reactor comprising:
   (a) a tubular wall having first and second ends, the wall and ends together defining an interior space having a longitudinal axis and adapted to house a vortex;
   (b) an inlet port in the first end for tangentially introducing a gas into the interior space to initiate circumferential movement of the gas in the interior space about the longitudinal axis to form the vortex;
   (c) an oxygen draw tube concentrically located in the interior space adjacent to the cylindrical wall, the oxygen draw tube being porous to oxygen gas at longitudinally spaced apart points;
   wherein the interior surfaces of the vortex tube reactor comprise a refractory material adapted to withstand a water-dissociating temperature.

14. The vortex tube reactor of claim 13 further comprising a hydrogen draw tube concentrically located in the interior space along the longitudinal axis, the hydrogen draw tube being porous to hydrogen gas at longitudinally spaced apart points.

* * * * *